US012216223B2

(12) United States Patent
Peng et al.

(10) Patent No.: US 12,216,223 B2
(45) Date of Patent: Feb. 4, 2025

(54) DETERMINING AN ORIENTATION OF A USER EQUIPMENT WITH A CELLULAR NETWORK

(71) Applicant: QUALCOMM Incorporated, San Diego, CA (US)

(72) Inventors: Yuxiang Peng, Sunnyvale, CA (US); Ning Luo, Cupertino, CA (US); Yuhua Hu, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 17/941,238

(22) Filed: Sep. 9, 2022

(65) Prior Publication Data

US 2024/0085514 A1  Mar. 14, 2024

(51) Int. Cl.
*G01S 5/02* (2010.01)
(52) U.S. Cl.
CPC ........ *G01S 5/0247* (2013.01); *G01S 5/02585* (2020.05)
(58) Field of Classification Search
CPC ............................ G01S 5/0247; G01S 5/02585
USPC ............... 342/442, 463, 451, 357.48, 21, 41
See application file for complete search history.

(56) References Cited

U.S. PATENT DOCUMENTS

| 8,915,116 | B2* | 12/2014 | Stanley | G01C 25/005 |
| | | | | 73/1.77 |
| 9,367,145 | B2* | 6/2016 | Sheynblat | G06F 1/1626 |
| 10,259,555 | B2* | 4/2019 | Ward | B63H 21/213 |
| 2010/0039318 | A1* | 2/2010 | Kmiecik | G01S 19/23 |
| | | | | 342/357.65 |
| 2015/0192656 | A1* | 7/2015 | Werner | G01S 3/46 |
| | | | | 342/442 |

* cited by examiner

*Primary Examiner* — Bo Fan
(74) *Attorney, Agent, or Firm* — Thien T. Nguyen

(57) ABSTRACT

Techniques are provided for utilizing reference signals transmitted by network stations to determine the orientation of a wireless node. An example method for determining an orientation of a user equipment includes determining a first location associated with the user equipment, determining a second location associated with a first wireless node, receiving, with the user equipment, a radio frequency signal transmitted from the first wireless node, determining two measurements based at least in part on the first location, the second location, and angle of arrival information associated with the radio frequency signal, determining a gravity vector based on inertial measurements obtained with the user equipment, and computing the orientation of the user equipment based at least in part on the gravity vector and the two measurements.

30 Claims, 16 Drawing Sheets

DETERMINING AN ORIENTATION OF A USER EQUIPMENT WITH A CELLULAR NETWORK

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points. Further, the capabilities of UE's may vary and positioning methods may be based on the capabilities of the devices. The orientation of a UE relative to other wireless nodes in a network (e.g., base stations, UEs, and other wireless devices) may be used in beamforming and/or positioning applications. The accuracy of the orientation information for a UE may impact beam forming operations and the performance of other local applications which rely on inertial measurements (e.g., accelerometers, gyroscopes, other sensors).

SUMMARY

An example method for determining an orientation of a user equipment according to the disclosure includes determining a first location associated with the user equipment, determining a second location associated with a first wireless node, receiving, with the user equipment, a radio frequency signal transmitted from the first wireless node, determining two measurements based at least in part on the first location, the second location, and angle of arrival information associated with the radio frequency signal, determining a gravity vector based on inertial measurements obtained with the user equipment, and computing the orientation of the user equipment based at least in part on the gravity vector and the two measurements.

An example for determining an orientation of a user equipment according to the disclosure includes determining a first location associated with the user equipment, determining a second location associated with a first wireless node, determining a third location associated with a second wireless node, determining a first angle of arrival information associated with a radio frequency signal transmitted from the first wireless node and received by the user equipment, determining a first two measurements based at least in part on the first location, the second location, and the first angle of arrival information, determining a second angle of arrival information associated with a radio frequency signal transmitted from the second wireless node and received by the user equipment, determining a second two measurements based at least in part on the first location, the third location, and the second angle of arrival information, and computing the orientation of the user equipment based at least in part on the first two measurements and the second two measurements.

Items and/or techniques described herein may provide one or more of the following capabilities, as well as other capabilities not mentioned. A wireless node, such as a user equipment (UE), may determine an angle-of-arrival for signals transmitted by one or more neighboring base stations or mobile devices. The wireless node may determine the current locations of the one or more neighboring base stations and mobile devices. The wireless node may be configured to obtain a gravity vector. The orientation of the wireless node may be computed based on the angle-of-arrival information and the locations of the neighboring base stations or mobile devices. Inertial sensors in the wireless node may be calibrated based on the computed orientation. Trigger conditions may be detected to initiate an orientation procedure. The accuracy of orientation based applications may be improved. The impact of signal drift associated with inertial sensors may be reduced. Other capabilities may be provided and not every implementation according to the disclosure must provide any, let alone all, of the capabilities discussed.

DETAILED DESCRIPTION

Figure 1:
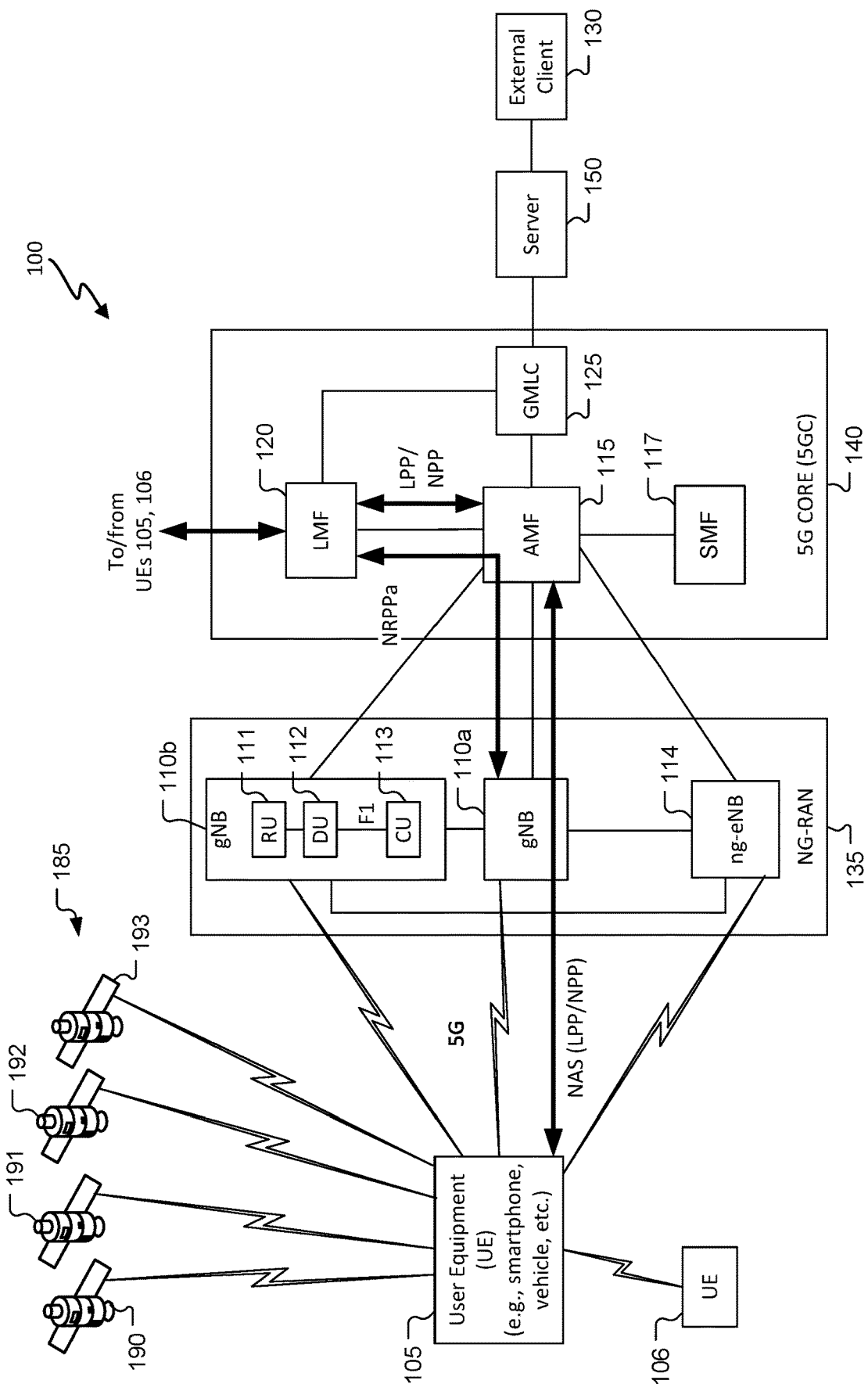
FIG. 1 is a simplified diagram of an example wireless communications system.

Techniques are discussed herein for utilizing reference signals transmitted by network stations to determine the orientation of a wireless node. A network may utilize reference signal measurements obtained by one or more wireless nodes to determine channel characteristics and position information for wireless devices in network. For example, downlink positioning reference signals (PRS) and uplink sounding reference signals (SRS) may be used to compute ranges based on the time-of-flight of the signals. The wireless nodes in a network, such as gNBs and UEs, may utilize one or more directional antenna arrays configured for beamforming transmitted and received signals. The wireless nodes may include phase shifters and crossover elements (e.g., Butler matrix) configured to enable the use of different angle-of-departure (AoD, ZoD) transmissions, and angle-of-arrival (AoA) and elevation angle-of-arrival (ZoA) measurements with phased-array antenna configurations. For terrestrial based wireless nodes, such as base stations, the orientations of the directional antennas is known and may be utilized for positioning measurements. The orientation of a mobile device, however, may be unknown or based upon measurements obtained from inertial sensors which are prone to be inaccurate due to signal drift and other functional limitations. The techniques provided herein provide the technical advantage of utilizing reference signals transmitted by neighboring wireless nodes to enable a mobile device to determine its orientation within the network. In an example, a mobile device may be configured to utilize reference signals transmitted from a single station at a known location in combination with a gravity vector to compute its orientation. A mobile device may be configured to utilize reference signals transmitted from multiple stations to determine an orientation. A mobile device with a known orientation may be configured to compute calibration factors for on-board inertial sensors. In an example, a mobile device may be configured to determine its orientation based on one or more trigger events such as when it is in a static state (e.g., not moving), when the uncertainty values associated with inertial sensors exceeds a threshold, or as required by other applications (e.g., beamforming, navigation, virtual reality, or other orientation based procedures). These techniques and configurations are examples, and other techniques and configurations may be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "wireless node," "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, virtual reality headset, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more BSs, e.g., one or more of the gNBs 110a, 110b and/or the ng-eNB 114 may be configured to communicate with the UE 105 via multiple carriers. Each of the gNBs 110a, 110b and the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110a, 110b, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110a includes an RU 111, a DU 112, and a CU 113. The RU 111, DU 112, and CU 113 divide functionality of the gNB 110a. While the gNB 110a is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110a. The DU 112 hosts the Radio Link Control (RLC), Medium Access Control (MAC), and physical layers of the gNB 110a. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110a. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110a, 110b (e.g., via the RU 111, the DU 112, and the CU 113) and/or the ng-eNB 114, and/or the LMF 120. As another example, the UE 105, one or more of the gNBs 110a, 110b (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
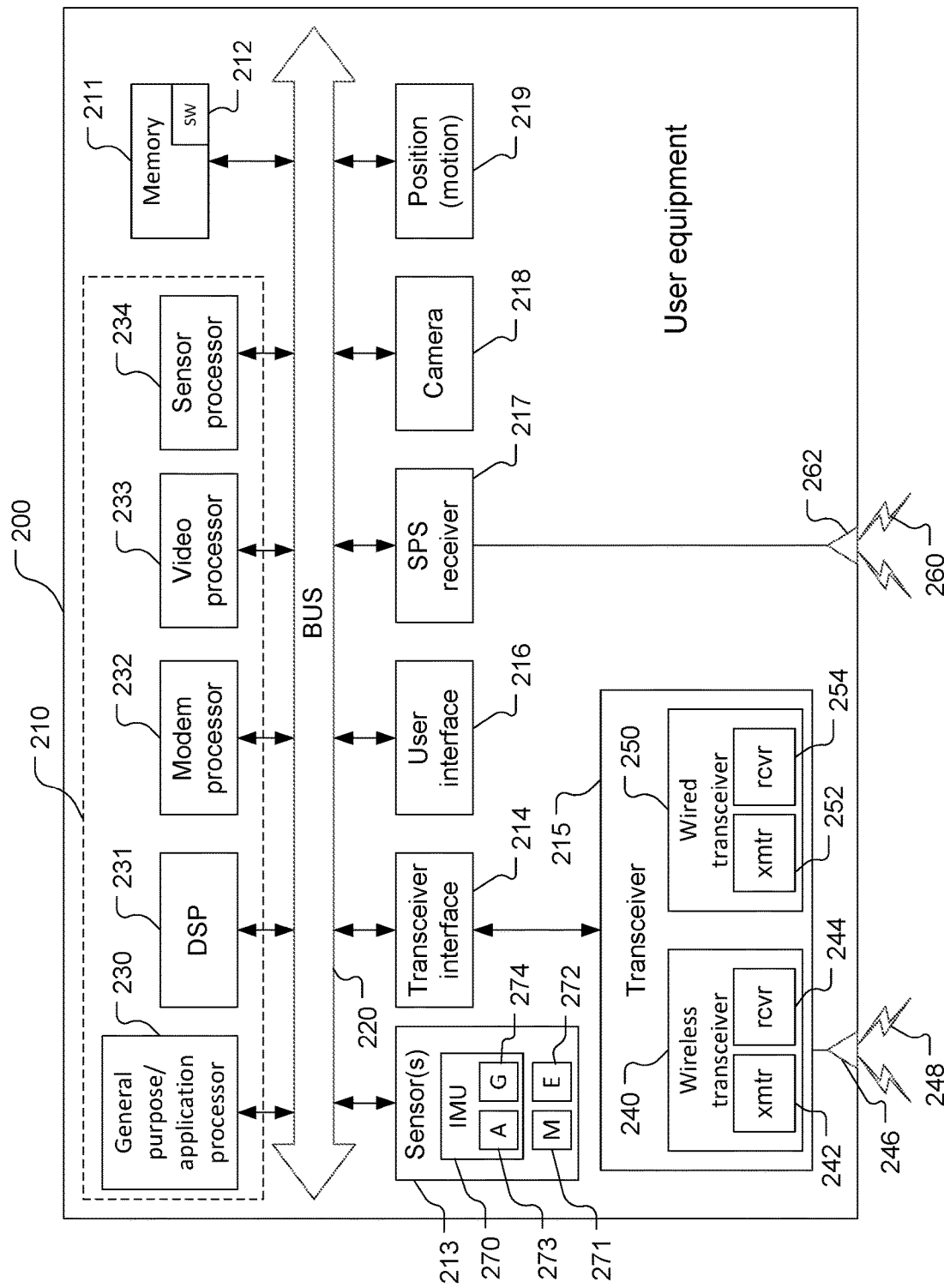
FIG. 2 is a block diagram of components of an example user equipment.

Referring also to FIG. 2, a UE 200 is an example of the UE 105 and comprises a computing platform including one or more processors 210, memory 211 including software (SW) 212, one or more sensors 213, a transceiver interface 214 for a transceiver 215 (that includes one or more wireless transceivers 240, and a wired transceiver 250), a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radio frequency (RF) sensing (with one or more wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-Vehicle-to-Everything (V2X), PCS, IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110a, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the wireless signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
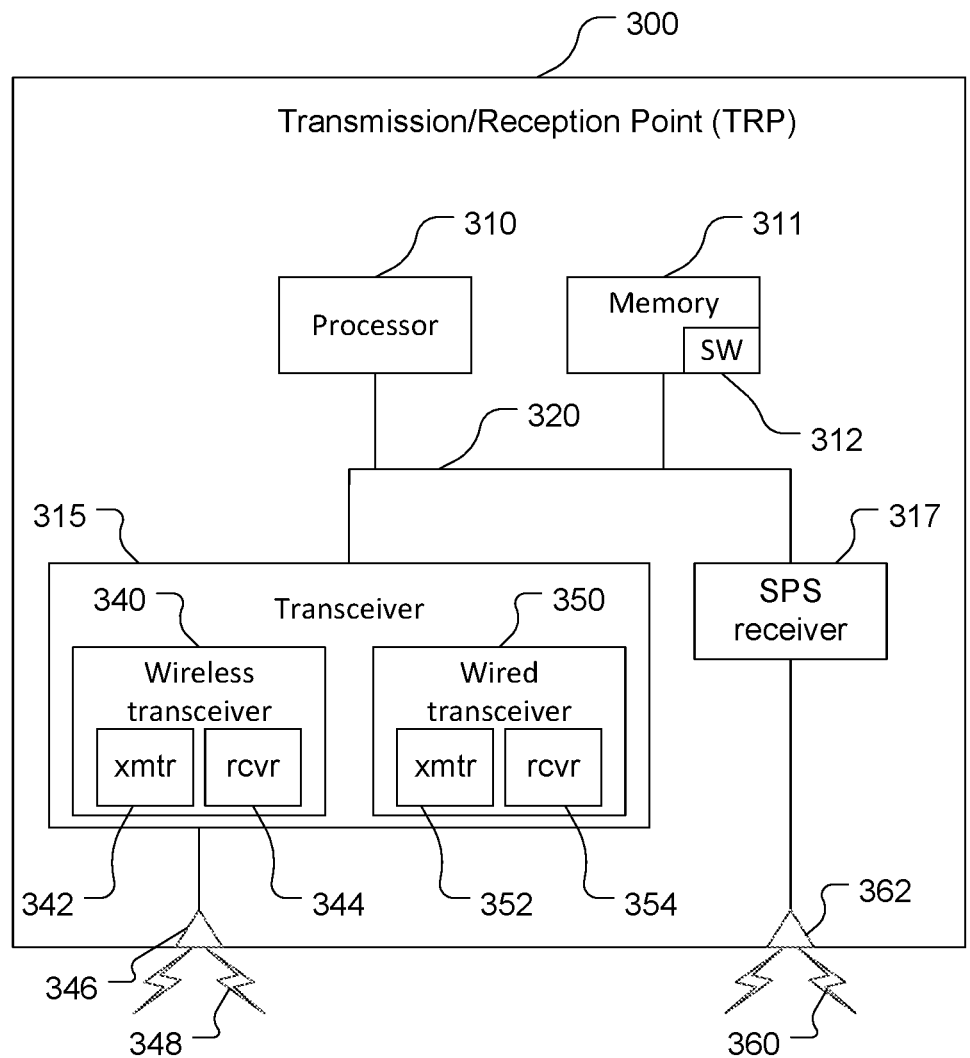
FIG. 3 is a block diagram of components of an example transmission/reception point.

Referring also to FIG. 3, an example of a TRP 300 of the BSs (e.g., gNB 110a, gNB 110b, ng-eNB 114) comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the gNB 110a, gNB 110b, ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink or downlink channels, and/or one or more sidelink channels) and/or receiving (e.g., on one or more downlink or uplink channels, and/or one or more sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
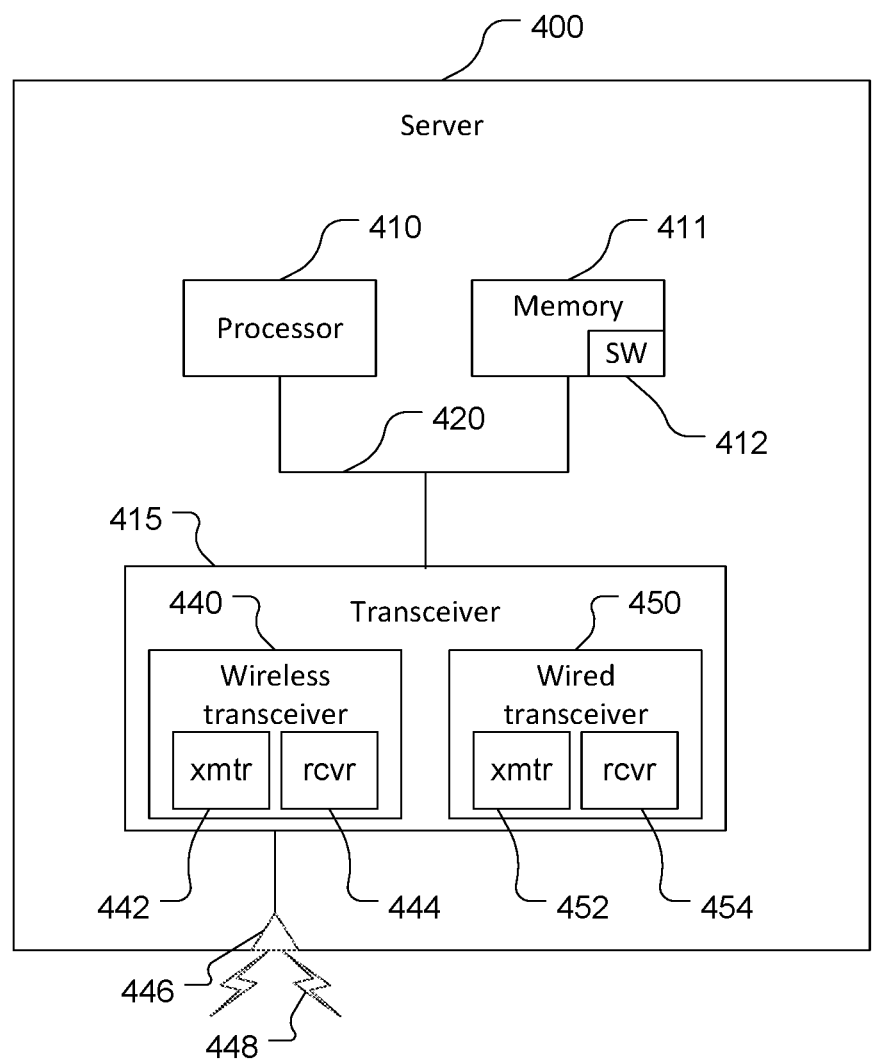
FIG. 4 is a block diagram of components of an example server.

Referring also to FIG. 4, an example of the LMF 120 comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 (or the LMF 120) performing a function as shorthand for one or more appropriate components of the server 400 (e.g., the LMF 120) performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

One or more of many different techniques may be used to determine position of an entity such as the UE 105. For example, known position-determination techniques include RTT, multi-RTT, RSTD (e.g., OTDOA, also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In RSTD techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In RSTD, the difference in arrival times at a receiving device of signals from different sources along with known locations of the sources and known offset of transmission times from the sources are used to determine the location of the receiving device.

Figure 5:
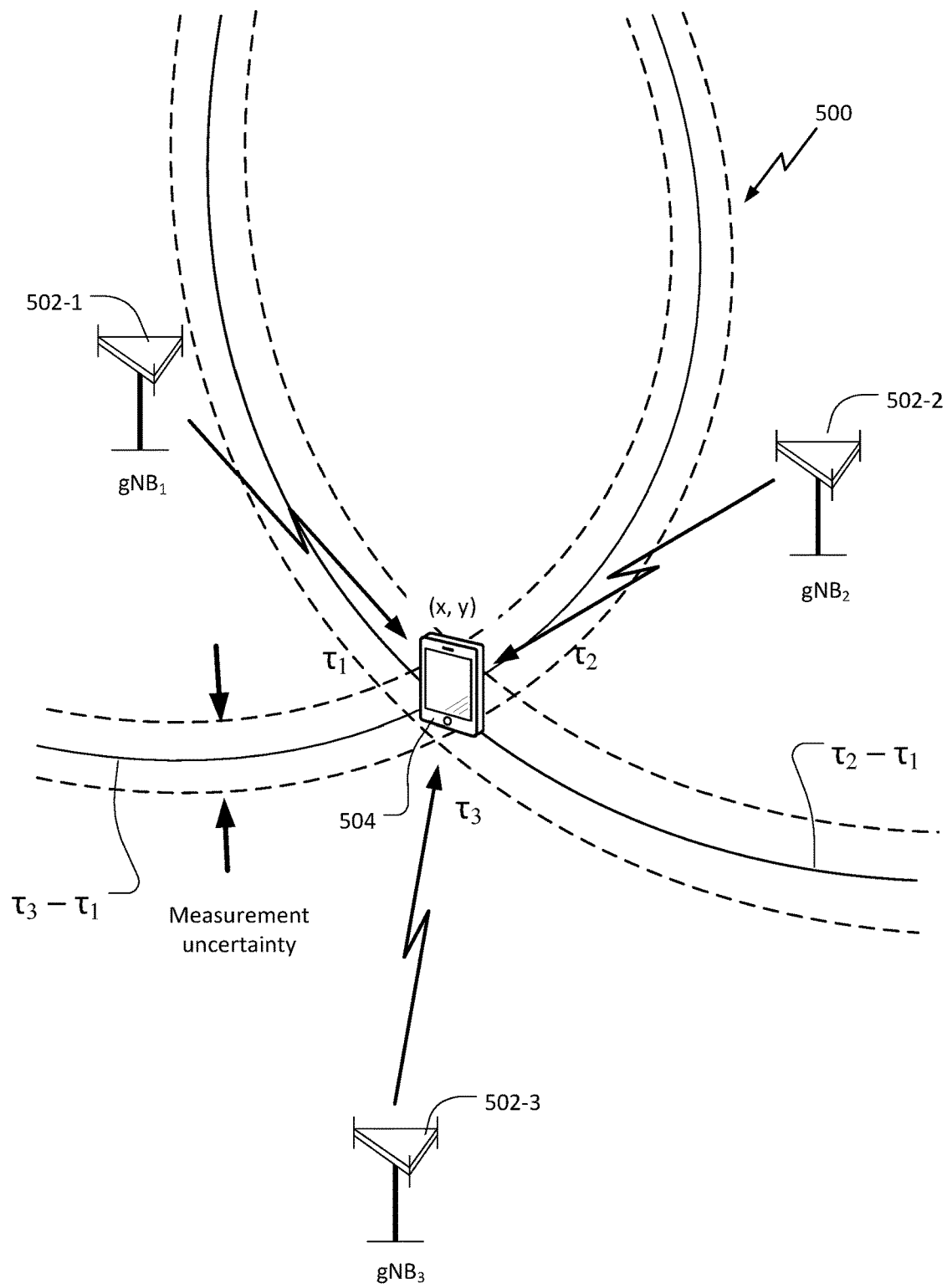
FIGS. 5, 6A and 6B are diagrams illustrating example techniques for determining a position of a mobile device using information obtained from one or more base stations.

Referring to FIG. 5, an example wireless communications system 500 according to various aspects of the disclosure is shown. In the example of FIG. 5, a UE 504, which may correspond to any of the UEs described herein, is attempting to calculate an estimate of its position, or assist another entity (e.g., a base station or core network component, another UE, a location server, a third party application, etc.) to calculate an estimate of its position. The UE 504 may communicate wirelessly with a plurality of base stations 502-1, 502-2, and 502-3 which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations locations, orientation of the antennas, geometry, etc.), the UE 504 may determine its position, or assist in the determination of its position, in a predefined reference coordinate system. In an aspect, the UE 504 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 5 illustrates one UE 504 and three base stations 502-1, 502-2, 502-3, as will be appreciated, there may be more UEs 504 and more or fewer base stations.

To support position estimates, the base stations 502-1, 502-2, 502-3 may be configured to broadcast positioning reference signals (e.g., PRS, NRS, TRS, CRS, etc.) to UEs in their coverage area to enable a UE 504 to measure characteristics of such reference signals. For example, the observed time difference of arrival (OTDOA) positioning method is a multilateration method in which the UE 504 measures the time difference, known as a reference signal time difference (RSTD), between specific reference signals (e.g., PRS, CRS, CSI-RS, etc.) transmitted by different pairs of network nodes (e.g., base stations, antennas of base stations, etc.) and either reports these time differences to a location server, such as the server 400 (e.g., the LMF 120), or computes a location estimate itself from these time differences.

Generally, RSTDs are measured between a reference network node (e.g., base station 502-1 in the example of FIG. 5) and one or more neighbor network nodes (e.g., base stations 502-2 and 502-3 in the example of FIG. 5). The reference network node remains the same for all RSTDs measured by the UE 504 for any single positioning use of OTDOA and would typically correspond to the serving cell for the UE 504 or another nearby cell with good signal strength at the UE 504. In an aspect, where a measured network node is a cell supported by a base station, the neighbor network nodes would normally be cells supported by base stations different from the base station for the reference cell and may have good or poor signal strength at the UE 504. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., server 400, LMF 120) may provide OTDOA assistance data to the UE 504 for the reference network node (e.g., base station 502-1 in the example of FIG. 5) and the neighbor network nodes (e.g., base stations 502-2 and 502-3 in the example of FIG. 5) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 504 as the reference network node.

In some cases, OTDOA assistance data may also include "expected RSTD" parameters, which provide the UE 504 with information about the RSTD values the UE 504 is expected to measure at its current location between the reference network node and each neighbor network node, together with an uncertainty of the expected RSTD parameter. The expected RSTD, together with the associated uncertainty, may define a search window for the UE 504 within which the UE 504 is expected to measure the RSTD value. OTDOA assistance information may also include reference signal configuration information parameters, which allow a UE 504 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., server 400, LMF 120) may send the assistance data to the UE 504, alternatively, the assistance data can originate directly from the network nodes (e.g., base stations 502) themselves (e.g., in periodically broadcasted overhead messages, etc.). Alternatively, the UE 504 can detect neighbor network nodes itself without the use of assistance data.

The UE 504 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., server 400, LMF 120, a base station 502) or the UE 504 may estimate a position of the UE 504. More particularly, the RSTD for a neighbor network node "k" relative to a reference network node "Ref" may be given as (ToAk−ToARef), where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau 2-\tau 1$ and $\tau 3-\tau 1$, where $\tau 1$, $\tau 2$, and $\tau 3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the server 400/LMF 120. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 504 position may be determined (either by the UE 504 or the server 400/LMF 120).

Still referring to FIG. 5, when the UE 504 obtains a location estimate using OTDOA measured time differences, the necessary additional data (e.g., the network nodes' locations and relative transmission timing) may be provided to the UE 504 by a location server (e.g., server 400, LMF 120). In some implementations, a location estimate for the UE 504 may be obtained (e.g., by the UE 504 itself or by the server 400/LMF 120) from OTDOA measured time differences and from other measurements made by the UE 504 (e.g., measurements of signal timing from global positioning system (GPS) or other global navigation satellite system (GNSS) satellites). In these implementations, known as hybrid positioning, the OTDOA measurements may contribute towards obtaining the UE's 504 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS), SRS for positioning signals) transmitted by the UE (e.g., UE 504). Further, transmission and/or reception beamforming at the base station 502-1, 502-2, 502-3 and/or UE 504 can enable wideband bandwidth at the cell edge for increased precision. Beam refinements may also leverage channel reciprocity procedures in 5G NR.

In NR, there is no requirement for precise timing synchronization across the network. Instead, it is sufficient to have coarse time-synchronization across gNBs (e.g., within a cyclic prefix (CP) duration of the OFDM symbols). Coarse timing synchronization is generally sufficient for Round-trip-time (RTT)-based methods, and the sidelink assisted methods described herein, and as such, are a practical positioning methods in NR.

Figure 6A:
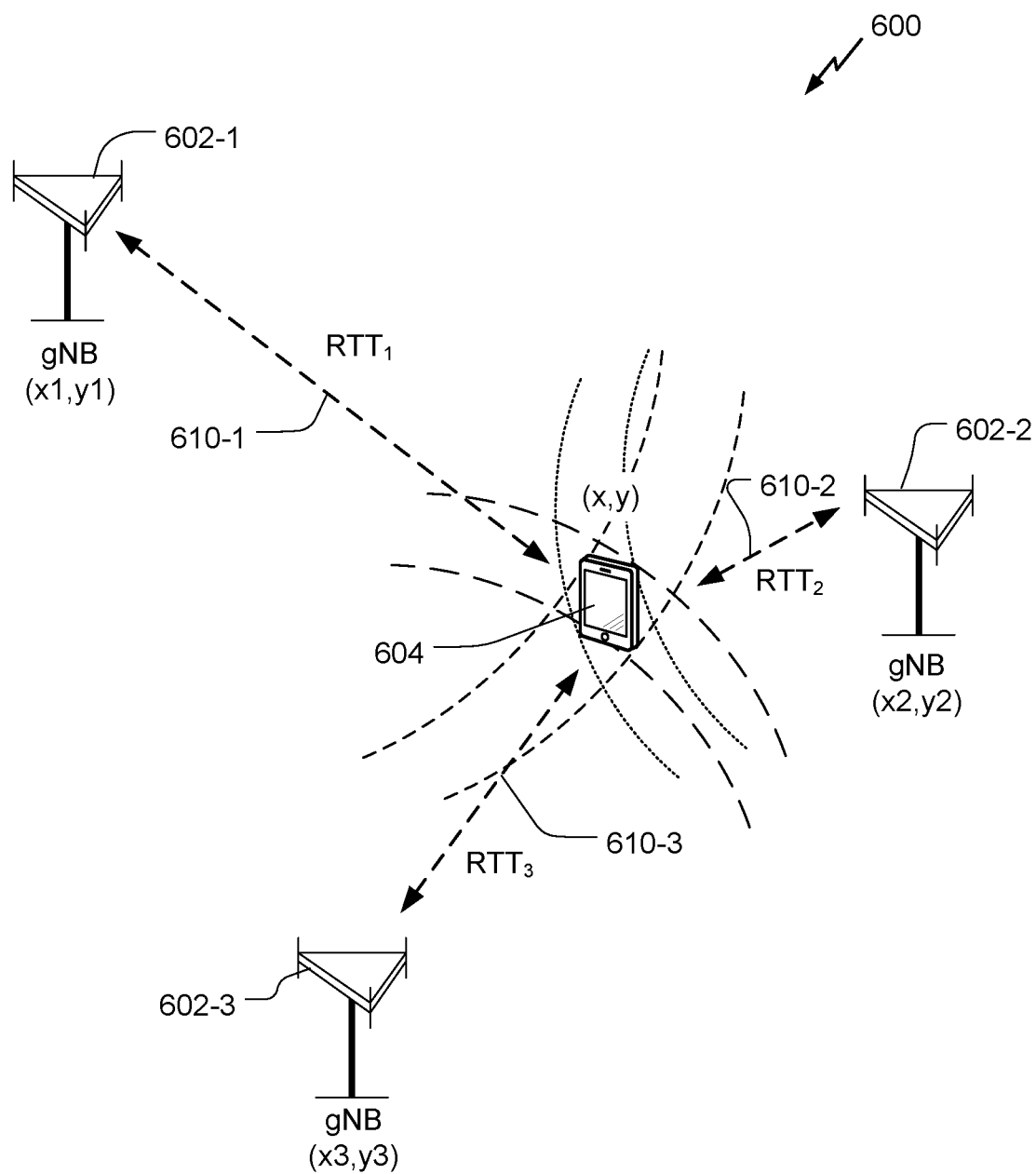

Referring to FIG. 6A, an exemplary wireless communications system 600 according to aspects of the disclosure is shown. In the example of FIG. 6A, a UE 604 (which may correspond to any of the UEs described herein) is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (which may correspond to any of the base stations described herein) using RF signals and standardized protocols for the modulation of the RF signals and the exchange of information packets. By extracting different types of information from the exchanged RF signals, and utilizing the layout of the wireless communications system 600 (i.e., the base stations' locations, geometry, etc.), the UE 604 may determine its position, or assist in the determination of its position, in a predefined reference coordinate system. In an aspect, the UE 604 may specify its position using a two-dimensional coordinate system; however, the aspects disclosed herein are not so limited, and may also be applicable to determining positions using a three-dimensional coordinate system, if the extra dimension is desired. Additionally, while FIG. 6A illustrates one UE 604 and three base stations 602-1, 602-2, 602-3, as will be appreciated, there may be more UEs 604 and more base stations.

To support position estimates, the base stations 602-1, 602-2, 602-3 may be configured to broadcast reference RF signals (e.g., PRS, NRS, CRS, TRS, CSI-RS, PSS, SSS, etc.) to UEs 604 in their coverage area to enable a UE 604 to measure characteristics of such reference RF signals. For example, the UE 604 may measure the ToA of specific reference RF signals (e.g., PRS, NRS, CRS, CSI-RS, etc.) transmitted by at least three different base stations and may use the RTT positioning method to report these ToAs (and additional information) back to the serving base station (e.g., base station 602-2) or another positioning entity (e.g., server 400, LMF 120).

In an aspect, although described as the UE 604 measuring reference RF signals from a base station 602-1, 602-2, 602-3, the UE 604 may measure reference RF signals from one of multiple cells supported by a base station 602-1, 602-2, 602-3. Where the UE 604 measures reference RF signals transmitted by a cell supported by a base station 602-2, the at least two other reference RF signals measured by the UE 604 to perform the RTT procedure would be from cells supported by base stations 602-1, 602-3 different from the first base station 602-2 and may have good or poor signal strength at the UE 604.

In order to determine the position (x, y) of the UE 604, the entity determining the position of the UE 604 needs to know the locations of the base stations 602-1, 602-2, 602-3, which may be represented in a reference coordinate system as $(x_k, y_k)$, where k=1, 2, 3 in the example of FIG. 6A. Where one of the base stations 602-2 (e.g., the serving base station) or the UE 604 determines the position of the UE 604, the locations of the involved base stations 602-1, 602-3 may be provided to the serving base station 602-2 or the UE 604 by a location server with knowledge of the network geometry (e.g., server 400, LMF 120). Alternatively, the location server may determine the position of the UE 604 using the known network geometry.

Either the UE 604 or the respective base station 602-1, 602-2, 602-3 may determine the distance ($d_k$, where k=1, 2, 3) between the UE 604 and the respective base station 602-1, 602-2, 602-3. In an aspect, determining the RTT 610-1, 610-2, 610-3 of signals exchanged between the UE 604 and any base station 602-1, 602-2, 602-3 can be performed and converted to a distance ($d_k$). RTT techniques can measure the time between sending a signaling message (e.g., reference RF signals) and receiving a response. These methods may utilize calibration to remove any processing and hardware delays. In some environments, it may be assumed that the processing delays for the UE 604 and the base stations 602-1, 602-2, 602-3 are the same. However, such an assumption may not be true in practice.

Once each distance $d_k$ is determined, the UE 604, a base station 602-1, 602-2, 602-3, or the location server (e.g., server 400, LMF 120) can solve for the position (x, y) of the UE 604 by using a variety of known geometric techniques, such as, for example, trilateration. From FIG. 6A, it can be seen that the position of the UE 604 ideally lies at the common intersection of three semicircles, each semicircle being defined by radius $d_k$ and center $(x_k, y_k)$, where k=1, 2, 3.

Figure 6B:
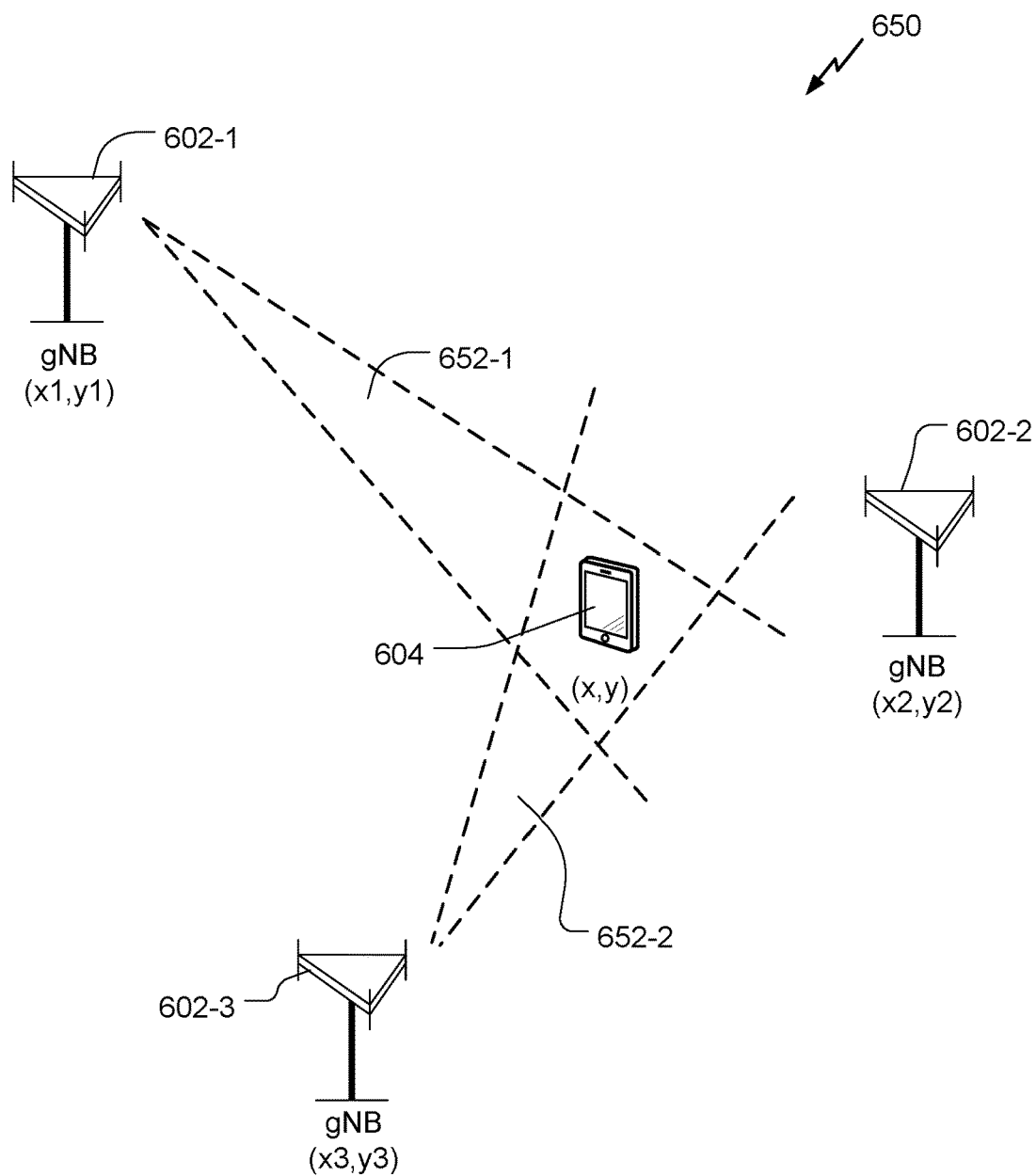

Referring to FIG. 6B, a diagram 650 of an example position estimate based on beamforming is shown. In an example, additional location information may be obtained in the form of an angle of arrival (AoA) or angle of departure (AoD) that defines a straight line direction (e.g., which may be in a horizontal plane or in three dimensions) or possibly a range of directions (e.g., for the UE 604 from the location of a base station 602-1, 602-2, 602-3). The intersection of the two directions at or near the point (x, y) can provide another estimate of the location for the UE 604. For example, a first beam 652-1 transmitted from the first station 602-1 may define a coverage area within the dimensions of the expected propagation path of the beam. In an example, the dimensions of the beam in combination with a range measurement may be used to generate a position for UE 604. Other beams may also be used to refine or determine a position of the UE 604. For example, a second beam 652-2 transmitted from the third base station 602-3 may be used to determine a bearing of the UE 604 relative to the third base station 602-3. A location estimate or the UE 604 may be based on the area of intersection between the first and second beams 652-1, 652-2. Other range measurements and beam angles may also be used to determine the position of the UE 604.

A position estimate (e.g., for a UE 604) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 7:
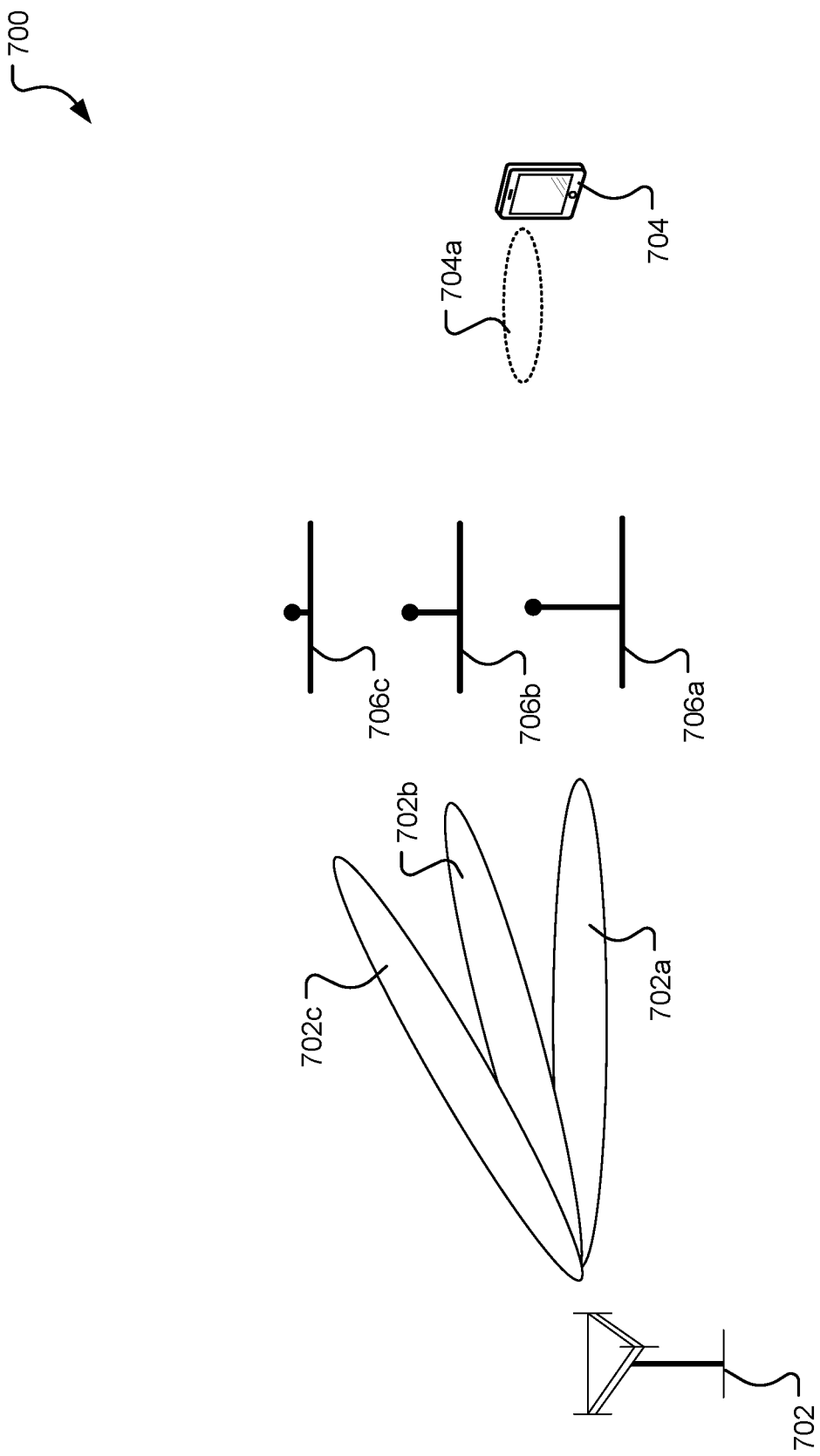
FIG. 7 includes example reference signal received power values for different radio frequency beams transmitted by a base station.

Referring to FIG. 7, a diagram 700 of example reference signal received power (RSRP) values for different radio frequency beams transmitted by a base station are shown. A base station 702 may be configured to utilize beamforming to transmit reference signals (RS) such as PRS, NRS, TRS, CRS, etc., and a mobile device, such as a UE 704, may be configured to receive and measure the reference signals. For example, the base station may transmit a first RS 702a at a first angle, a second RS 702b at a second angle, and a third RS 702c at a third angle. The angles of the RS 702a-b may be based on 3D coordinates and may include azimuth and elevation angles. In an example, the UE 704 may be configured to utilize receive beamforming and may receive the RS 702*a-c* with a receive beam 704*a*. The relative RSRPs for each of the RS 702*a-c* as received by the UE 704 are illustrated as graphs in the diagram 700. A first RSRP value 706*a* is associated with the first RS 702*a*, as second RSRP value 706*b* is associated with the second RS 702*b*, and a third RSRP value 706*c* is associated with the third RS702*c*. The UE 704 may utilize the relatively higher first RSRP value 706*a* to determine a bearing to the base station 702. For example, assistance data received from the network may include beam information including the transmit bearings for the RSs 702*a-c* and the UE 704 may be configured to determine the bearing to the base station 702 as the reciprocal value of the transmission angle for the first RS 702*a* (e.g., the transmit bearing of the first RS is 090 and the reciprocal value is 270). In an example, the UE 704 may be configured to utilize an AoA for the first RS 702*a* to determine a bearing to the base station 702. The AoA for the first RS 702*a* is based on the orientation of the receiving antenna array, which may also be based on the orientation of the UE 704.

Figure 8A:
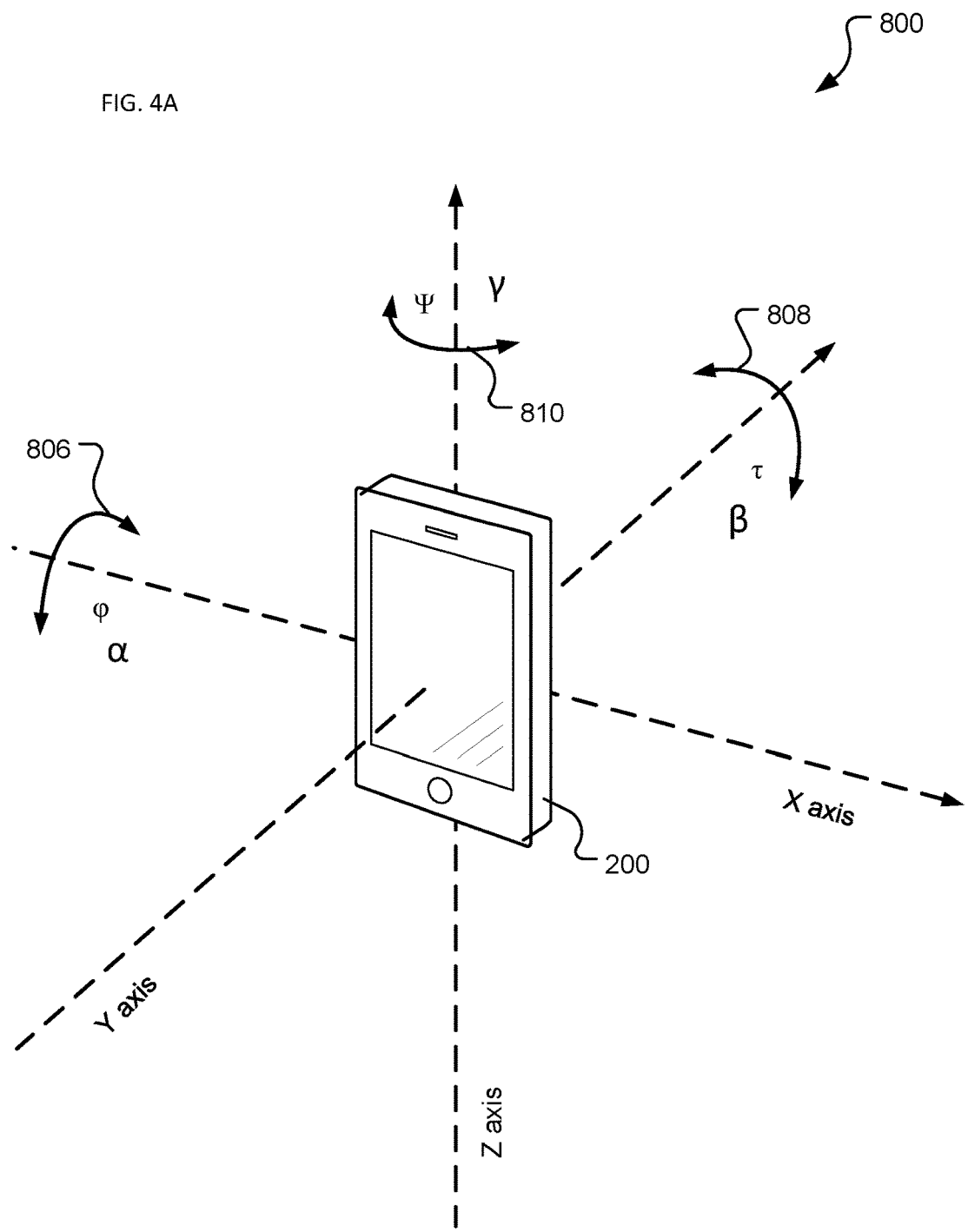
FIG. 8A is a diagram of an example coordinate system associated with a mobile device.

Referring to FIG. 8A, an example coordinate system 800 that may be used, in whole or in part, to facilitate or support measurements obtained via inertial sensors of a UE 200 is shown. Inertial sensor measurements may be obtained based, at least in part, on output signals generated by an associated accelerometer 273 or gyroscope 274, for example. An example coordinate system 800 may comprise a three-dimensional Cartesian coordinate system. The displacement of the UE 200 representing, for example, acceleration vibration may be detected or measured, at least in part, by a suitable accelerometer, such as a three-dimensional (3D) accelerometer, for example, with reference to three linear dimensions or axes X, Y, and Z relative to the origin of example coordinate system 800. It should be appreciated that example coordinate system 800 may or may not be aligned with a body of UE 200. In an implementation a non-Cartesian coordinate system may be used or that a coordinate system may define dimensions that are mutually orthogonal.

At times, rotational motion of the UE 200, such as orientation changes about gravity may be detected or measured, at least in part, by one or more accelerometers 273 with reference to one or two dimensions. For example, in some instances, rotational motion of the UE 200 may be detected or measured in terms of coordinates ($\varphi$(phi), $\tau$(tau)), where phi ($\varphi$) represents roll or rotation about an X axis, as illustrated generally by the arrow at 806, and tau ($\tau$) represents pitch or rotation about an Y axis, as illustrated generally at 808. The rotational motion of the UE 200 may also be detected or measured by a gyroscope 274, such as, for example, with respect to X, Y, and Z orthogonal axes. Accordingly, a 3D accelerometer may detect or measure, at least in part, a level of acceleration vibration as well as a change about gravity with respect to roll or pitch dimensions, for example, thus, providing five dimensions of observability (X, Y, Z, $\varphi$, $\tau$). Of course, these are merely examples of motions that may be detected or measured, at least in part, with reference to example coordinate system 800, and claimed subject matter is not limited to particular motions or coordinate system.

In an example, the rotational motion of the UE 200 may be detected or measured, at least in part, by a suitable gyroscope 274 so as to provide adequate or suitable degrees of observability. The gyroscope 274 may detect or measure rotational motion of the UE 200 with reference to one, two, or three dimensions. Thus, in some instances, gyroscopic rotation may, for example, be detected or measured, at least in part, in terms of coordinates ($\varphi$, $\tau$, $\Psi$), where phi ($\varphi$) represents roll or rotation 806 about an X axis, tau ($\tau$) represents pitch or rotation 808 about an Y axis, and psi ($\psi$) represents yaw or rotation about a Z axis, as referenced generally at 810. A gyroscope may typically, although not necessarily, provide measurements in terms of angular acceleration (e.g., a change in an angle per unit of time squared), angular velocity (e.g., a change in an angle per unit of time), or the like. Likewise, here, details relating to motions that may be detected or measured, at least in part, by a gyroscope with reference to the example coordinate system 800 are merely examples, and claimed subject matter is not so limited.

Figure 8B:
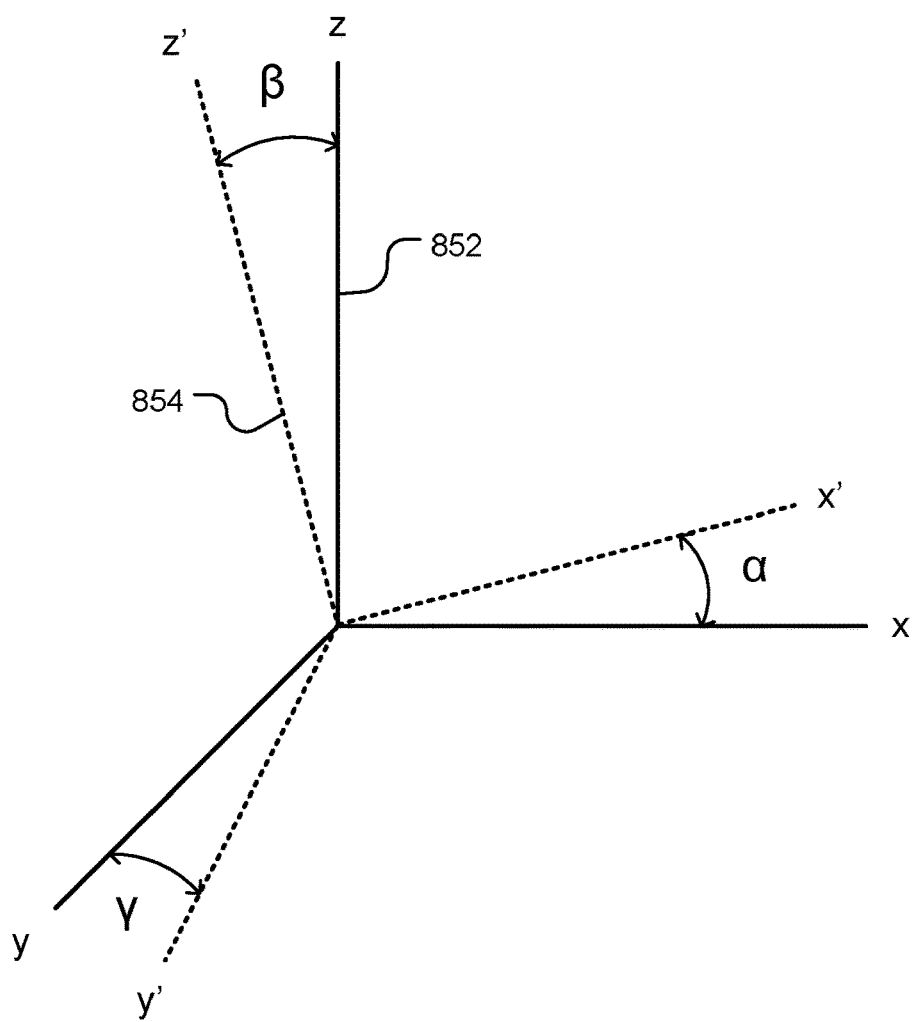
FIG. 8B is a diagram of an example transformation from a local coordinate system to a global coordinate system.

Referring to FIG. 8B, a diagram 850 of an example transformation from a local coordinate system (LCS) to a global coordinate system (GCS) is shown. In general, a GCS 852 is defined for a system comprising multiple BSs and UEs. An array antenna for a BS or a UE can be defined in a LCS 854. The LCS 854 is used as a reference to define the vector far-field that is pattern and polarization, of each antenna element in an array. The far-field may be known in the LCS by formula. The placement of an array within the GCS 852 is defined by the translation between the GCS and a LCS. The orientation of the array with respect to the GCS is defined in general by a sequence of rotations (e.g., described in 3GPP TR 38.901, clause 7.1.3 V16.1.0 (2019-12)). Since this orientation is in general different from the GCS orientation, it is necessary to map the vector fields of the array elements from the LCS to the GCS. This mapping depends on the orientation of the array and is given by the equations in clause 7.1.3. In an example, an arbitrary mechanical orientation of the array can be achieved by rotating the LCS 854 with respect to the GCS 852. An arbitrary 3D-rotation of the LCS 854 with respect to the GCS 852 may be defined by the angles alpha ($\alpha$), beta ($\beta$), gamma ($\gamma$). The set of angles $\alpha$, $\beta$, $\gamma$ can also be termed as the orientation of the array antenna with respect to the GCS. The transformation from the LCS 854 to a GCS 852 may depend on the angles $\alpha$, $\beta$, $\gamma$. The angle $\alpha$ may be referred to as the bearing angle, $\beta$ may be referred to as the down tilt angle, and $\gamma$ may be referred to as the slant angle. The transformation from the LCS 854 to the GCS 852 may be used herein to determine the orientation of a UE and/or calibrate the inertial sensors (e.g., the IMU 270) in the UE.

Figure 9:
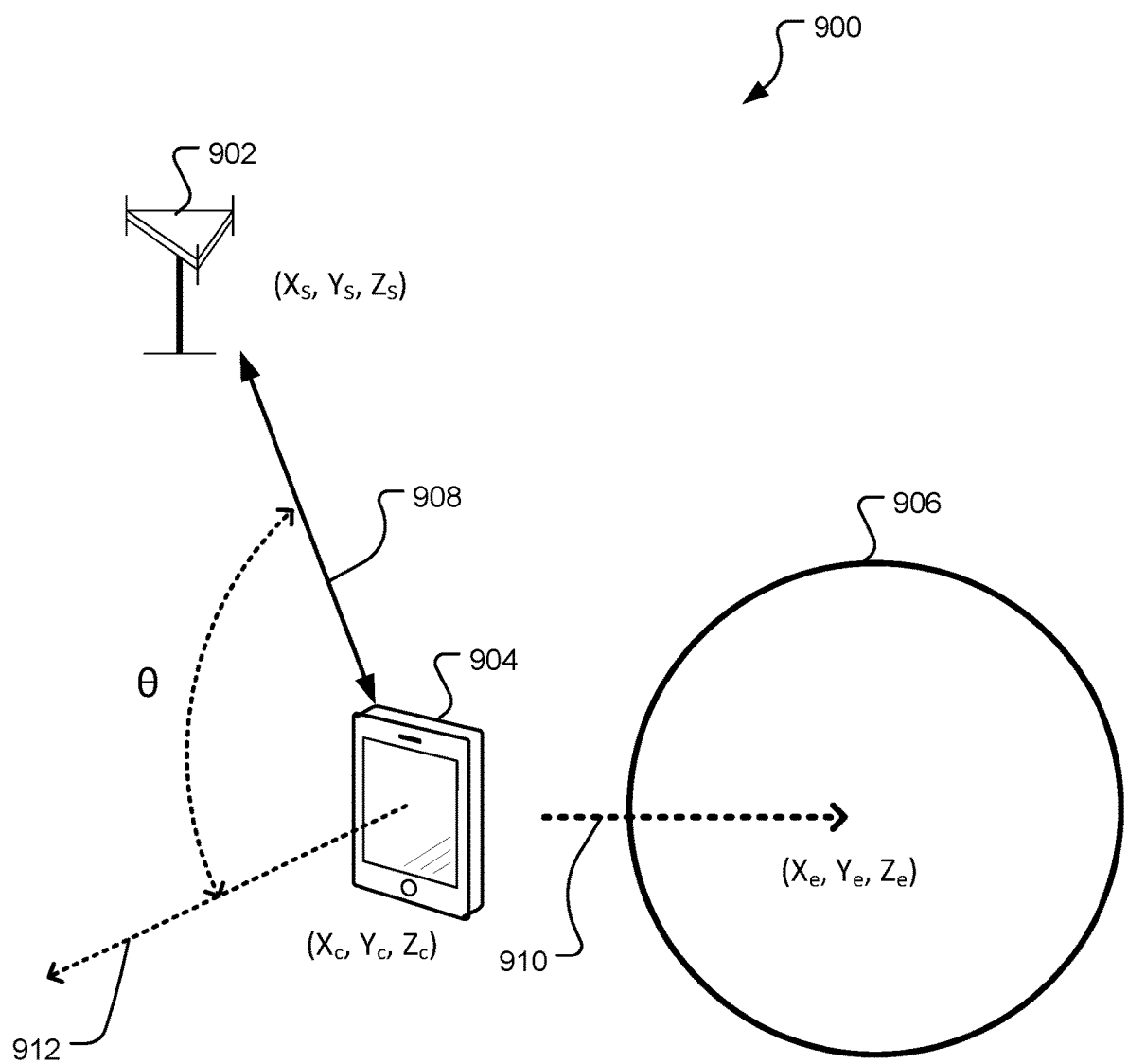
FIG. 9 is a diagram of an example process for determining an orientation of a mobile device based on reference signals transmitted by a single wireless node.
Figure 10:
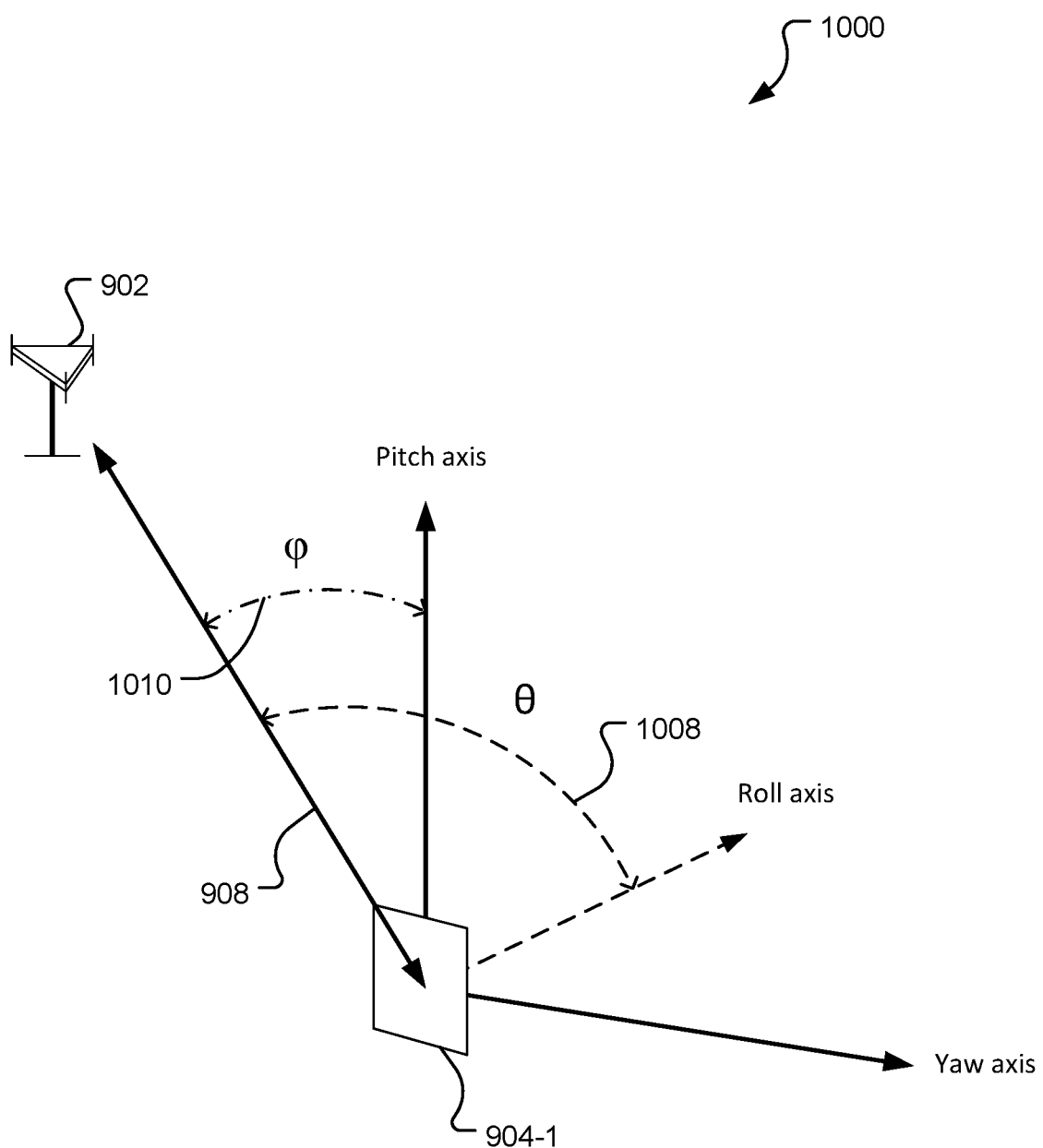
FIG. 10 is a diagram of example observation functions for a received reference signal.

Referring to FIG. 9, a diagram 900 of an example process for determining an orientation of a mobile device based on reference signals transmitted by a single wireless node is shown. The diagram 900 includes a base station 902, a UE 904, and a conceptual indication of the earth 906. The UE 904 is configured to receive signals 908 transmitted from the base station 902 and may determine a relative AoA for the signals 908. The UE 904 may also determine a gravity vector 910 based on signals generated from inertial sensors, such as the IMU 270. The current attitude of the UE 904 is indicated by an alignment vector 912. Referring to FIG. 10, with further reference to FIG. 9, a diagram 1000 of example observation functions for a received reference signal is shown. The signal 908 is received by an antenna array 904-1 (located on the frame of the UE 904). The observation functions are based on a Roll, Pitch, Yaw (RPY) frame associated with the antenna array 904-1, and by extension the UE 904. For example, a first observation function 1008 (theta ($\theta$)) may be associated with an elevation angle and may be measured from the roll axis. A second observation function 1010 (phi ($\phi$) may be associated with an azimuth angle, and may be measured from the pitch axis. In an example, the current attitude of the UE 904 (based on the fixed orientation of the antenna array 904-1) may be expressed as $\Re_{ENU}^{RPY}$ and determined based on a rotation matrix from the RPY frame associated with the UE 904 (e.g., a LCS) to an East, North, Up (ENU) frame (e.g., a GCS), based on 3 rotation angles ($\alpha$, $\beta$, $\gamma$) from RPY to ENU frame, as generally depicted in FIG. 8B. The rotation matrix $\Re_{ENU}^{RPY} = R_x(\alpha) R_y(\beta) R_z(\gamma)$, where:

$$R_x(\alpha) = \begin{bmatrix} 1 & 0 & 0 \\ 0 & \cos\alpha & -\sin\alpha \\ 0 & \sin\alpha & \cos\alpha \end{bmatrix} \text{(i.e., } x: R \to E\text{)} \quad (1)$$

$$R_y(\beta) = \begin{bmatrix} \cos\beta & 0 & \sin\beta \\ 0 & 1 & 0 \\ -\sin\beta & 0 & \cos\beta \end{bmatrix} \text{(i.e., } y: P \to N\text{)} \quad (2)$$

$$R_z(\gamma) = \begin{bmatrix} \cos\gamma & -\sin\gamma & 0 \\ \sin\gamma & \cos\gamma & 0 \\ 0 & 0 & 1 \end{bmatrix} \text{(i.e., } z: Y \to U\text{)} \quad (3)$$

In operation, referring back to FIG. 9, the UE 904 may be configured to obtain the location of the base station 902 ($x_s$, $y_s$, $z_s$)$_{ECI}$ in an earth centered inertial (ECI) frame. For example, the UE 904 may receive assistance data indicating the location of the base station 902, and/or the base station 902 may broadcast or otherwise transmit location and beam configuration information. The UE 904 may also be configured to determine a current location ($x_c$, $y_c$, $z_c$) in the ECI and/or ENU frame using terrestrial and/or satellite navigation signals (e.g., RTT, TDOA, GNSS, etc.). The UE 904 may convert the location of the base station 902 to the ENU frame ($x_s'$, $y_s'$, $z_s'$)$_{ENU}$ based on the current location ($x_c$, $y_c$, $z_c$). The UE 904 may determine the AoA of the signal 908, including the two observation functions 1008, 1010, including the elevation ($\theta$) and azimuth ($\varphi$) angles based on the RPY frame of the UE 904. In general, the orientation of a UE's antenna array is known and fixed to the UE body frame.

The UE 904 may determine a vector from the UE 904 to the base station 902 in RPY frame as:

$$(x_s'', y_s'', z_s'')_{RPY} = (x_s', y_s', z_s')_{ENU} \Re_{ENU}^{RPY^{-1}} \quad (4)$$

The UE 904 may determine the two observation functions 1008, 1010 relating the AoA of the signal 908 3D device attitude information:

$$\theta = \text{observation func1}(\alpha,\beta,\gamma) = \arctan(\sqrt{y_s''^2 + z_s''^2}/x_s'') \quad (5)$$

$$\varphi = \text{observation func2}(\alpha,\beta,\gamma) = \arctan 2(y_s'', z_s'') \quad (6)$$

The UE 904 may determine the gravity vector 910 with the IMU 270 in the RPY frame. In an example, the IMU 270 may be pre-calibrated as described below. The gravity vector 910 may be expressed as ($x_g$, $y_g$, $z_g$)$_{RPY}$. Thus, transformation of the gravity vector may be expressed as:

$$(0, 0, -g)_{ENU} = (x_g, y_g, z_g)_{RPY} R_{ENU}^{RPY} \quad (7)$$

$$= \begin{bmatrix} \cos\gamma[x_g\cos\beta - \sin\beta(z_g\cos\alpha - y_g\sin\alpha)] + \\ \sin\gamma(y_g\cos\alpha + z_g\sin\alpha) \\ -\sin\gamma[x_g\cos\beta - \sin\beta(z_g\cos\alpha - y_g\sin\alpha)] + \\ \cos\gamma(y_g\cos\alpha + z_g\sin\alpha) \\ x_g\sin\beta + \cos\beta(z_g\cos\alpha - y_g\sin\alpha) \end{bmatrix}^T_{ENU} \quad (8)$$

-continued $$0 = \cos\gamma[x_g\cos\beta - \sin\beta(z_g\cos\alpha - y_g\sin\alpha)] + \sin\gamma(y_g\cos\alpha + z_g\sin\alpha) \quad (9)$$

$$0 = -\sin\gamma[x_g\cos\beta - \sin\beta(z_g\cos\alpha - y_g\sin\alpha)] + \cos\gamma(y_g\cos\alpha + z_g\sin\alpha) \quad (10)$$

$$-g = x_g\sin\beta + \cos\beta(z_g\cos\alpha - y_g\sin\alpha) \quad (11)$$

The UE 904 may utilize equations (5), (6), (9), (10) and (11) to fully solve $\Re_{ENU}^{RPY}$ or the 3 unknown rotation angles ($\alpha$, $\beta$, $\gamma$). Thus, the UE 904 may be configured to determine its current orientation in the ENU frame based on receiving signals from one station with a known location, and a gravity vector obtained from a calibrated IMU.

Figure 11:
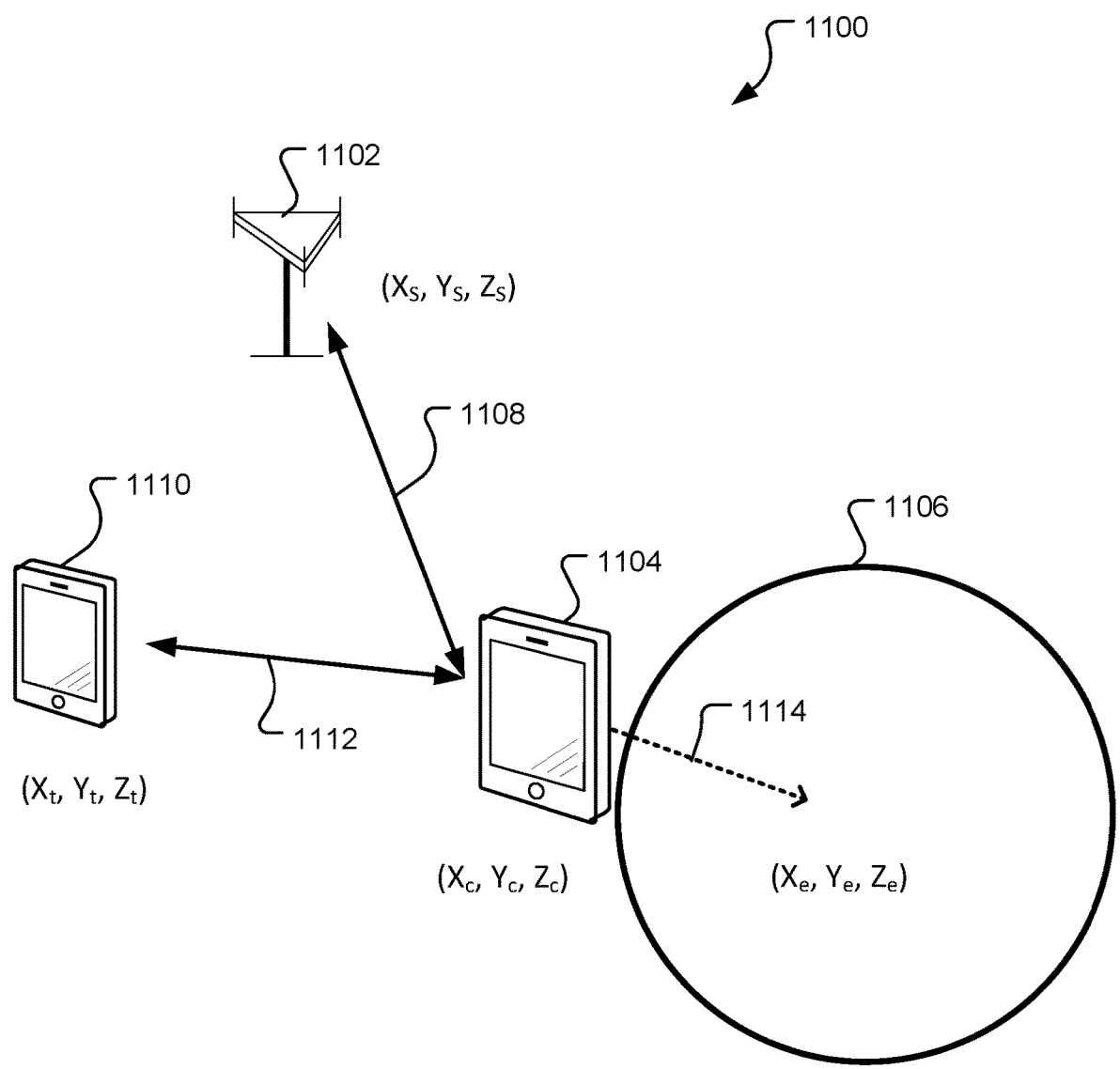
FIG. 11 is a diagram of an example process for determining an orientation of a mobile device based on reference signals transmitted by a plurality of wireless nodes.

Referring to FIG. 11, with further reference to FIGS. 9 and 10, a diagram 1100 of an example process for determining an orientation of a mobile device based on reference signals transmitted from a plurality of wireless nodes is shown. In operation, a UE 1104 may have an uncalibrated IMU and the single station procedure described in FIG. 9 may not achieve accurate results. The multi-station approached described in FIG. 11 does not depend on a gravity vector and thus may be used when a IMU is not available and/or out of calibration. In an example, the multiple wireless nodes may include a base station 1102 and a second mobile device 1110 which is also at a known location ($x_t$, $y_t$, $z_t$). The second mobile device 1110 may be a proximate UE configured to communicate with the UE 1104 via one or more sidelink and/or D2D communication protocols. In a V2X implementation, the second mobile device 1110 may be an On Board Unit (OBU) in a vehicle, or a Roadside Unit (RSU) configured to communicate with the UE 1104. In an example, the UE 1104 may receive a first reference signal 1108 from the base station 1102, and a second reference signal 1112 from the second mobile device 1110. The first and second reference signals 1108, 1112 may utilize different radio access technologies (e.g., cellular, WiFi, Uu, PCS, etc.). The UE 1104 is configured to obtain the current locations of the base station 1102 and the second mobile device 1110, and determine AoA information for both of the received reference signals 1108, 1112. The locations of the base station 1102 and the second mobile device 1110 may be included in assistance data, broadcast, or in response to a request message transmitted by the UE 1104.

In operation, the UE 1104 may be configured to determine respective vectors to the base station 1102 and the second mobile device 1110 as described in equation (4). The UE 1104 may utilize multiple sets of equations (5) and (6) to determine a first two observation functions based on the first vector between the UE 1104 and the base station 1102, and a second two observation functions based on the second vector between the UE 1104 and the second mobile device 1110. Thus, the UE 1104 may utilize the three known locations (e.g., of the UE 1104, the base station 1102 and the second mobile device 1110) and the respective vectors based on the reference signals 1108, 1112 to determine the orientation of the UE 1104 without the need of obtaining a measurement from the IMU. The two-station method in FIG. 11 may also be utilized in the singular case such that the received reference signal is at an elevation of 90 degrees (e.g., opposite the gravity vector).

In an example, the orientation of the UE 1104 obtained with the multi-station method in FIG. 11 may be used to calibrate the IMU in the UE 1104 and body frame misalignment. The UE 1104 may be configured to obtain a gravity vector 1114 (e.g., based on earth 1106) with an onboard IMU (e.g., the IMU 270) in the RPY frame ($x_g$, $y_g$, $z_g$)$_{RPY}$. The UE 1104 may be configured to convert the gravity vector 1114 into ENU frame $(x_g, y_g, z_g)_{ENU} = (x_g, y_g, z_g)_{RPY} \mathfrak{R}_{ENU}^{RPY}$. The UE 1104 may compare the measured gravity vector to a theoretical gravity vector based on the current orientation to determine if calibration is needed. For example, if $(x_g, y_g, z_g)_{ENU} \neq (0,0,-1)_{ENU}$, then IMU calibration maybe required. In an example, threshold values (e.g., seconds, minutes, degrees) may be used to trigger an IMU calibration.

The orientation of the UE 1104 may be used to calibrate sensor bias. For example, the single-station example in FIG. 9 may be used to calibrate IMU gyro bias, vehicle steering angle sensors, and other motion and direction detection sensors. The two-station example in FIG. 11 may be used for IMU calibration (e.g., accelerator and gyro bias values), as well as other motion and direction detection sensors.

The orientation detection techniques described herein may be engaged based on one or more operational factors and/or trigger conditions. For example, when a UE is in a static lockdown state (e.g., not moving) the IMU elements may drift and cause sensor errors. The UE may be configured to determine an orientation based on network reference signals based on a motion detection signal and/or periodically (e.g., 10, 30, 60, 100, secs. etc.). Other factors may cause the IMU signals to drift and the uncertainty of the sensor outputs (e.g., covariance matrix in a Kalman filter) may exceed established thresholds (e.g., 10 degrees). The orientation procedures may be executed when the uncertainty exceeds the threshold value. Other functional issues associated with the IMU, camera, magnetometer, or other devices within the UE may require orientation information. For example, the orientation of a VR headset may drift over time and may be updated prior to a motion intense sequence. Other applications and application programming interfaces (APIs) may request orientation information and trigger a UE orientation determination procedure. Beamforming applications may also require updated orientation information.

Figure 12:
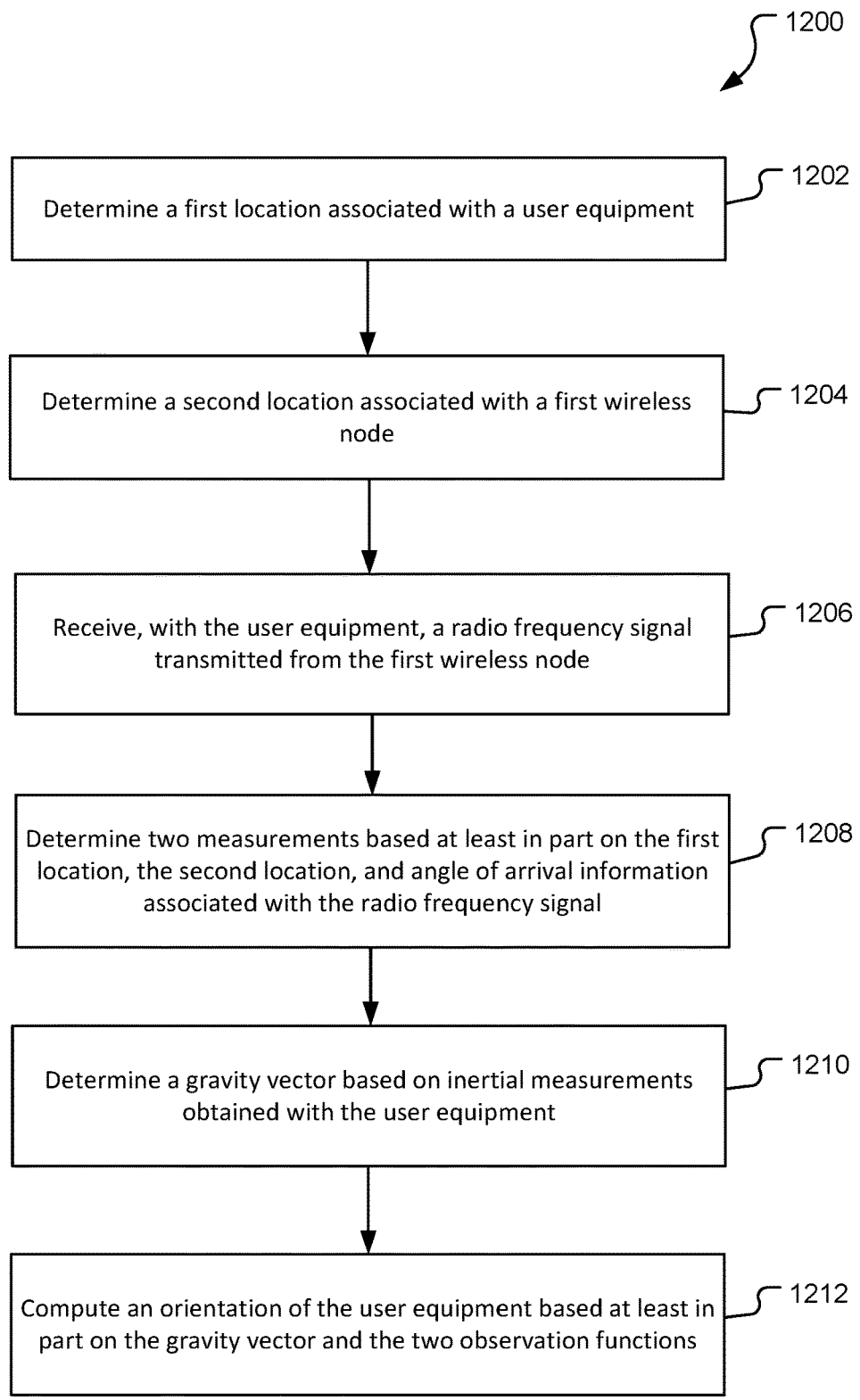
FIG. 12 is a block flow diagram of an example method for computing an orientation of a user equipment based on signals received from a wireless node.

Referring to FIG. 12, with further reference to FIGS. 1-11, a method 1200 of computing an orientation of a wireless node based on signals received from another wireless node includes the stages shown. The method 1200 is, however, an example and not limiting. The method 1200 may be altered, e.g., by having stages added, removed, rearranged, combined, performed concurrently, and/or having single stages split into multiple stages.

At stage 1202, the method includes determining a first location associated with a user equipment. A UE 200, including processors 210, the transceiver 215 and the SPS receiver 217, is a means for determining the first location associated with the UE. In an example, referring to FIG. 9, the second wireless node is the UE 904 and is configured to determine a current position based on terrestrial and/or satellite reference signals. For example, the UE 904 may utilize known network positioning techniques such as depicted in FIGS. 5, and 6A to determine a location based on radio signal exchanges with other network stations. In an example, the SPS receiver 217 may provide satellite signal information (e.g., GPS) to determine the location of the UE 904. Other positioning techniques may be used to determine the first location associated with the UE. In an example, a base station may require a new antenna installation, and the location of the new antenna may be known and the orientation detection techniques described herein may be utilized to determine/calibrate the new antenna configuration.

At stage 1204, the method includes determining a second location associated with a first wireless node. The UE 200, including processors 210 and the transceiver 215, is a means for determining the second location associated with the first wireless node. In an example, referring to FIG. 9, the second location may be the location of the base station 902 and may be determined based on assistance data provided to the UE 904. For example, the UE 904 may receive assistance data via network signaling such as LPP and/or RRC messages (e.g., System Information Blocks) including the location of the base station 902. Other signaling techniques may also be used. For example, the base station 902 may periodically broadcast current location information. In an example, the first wireless node may be a mobile device at a known location. In a V2X schema, a vehicle may be configured to broadcast Basic Safety Messages (BSMs) including location information. Other techniques may be used to determine the second location associated with the first wireless node.

At stage 1206, the method includes receiving, with the user equipment, a radio frequency signal transmitted from the first wireless node. The UE 200, including processors 210 and the transceiver 215, is a means for receiving the RF signal transmitted from the second wireless node. In an example, the RF signal may be one or more reference signals (e.g., PRS, NRS, TRS, CRS, etc.) broadcast to wireless nodes in a coverage area. In a 5G NR application, for example, the RF signal may be a beamformed signal transmitted to the second wireless node. Referring to FIG. 9, the RF signal may be the signals 908 transmitted by the base station 902. The UE 904 is configured to determine AoA information associated with the received RF signals, as depicted in FIG. 10.

At stage 1208, the method includes determining two measurements based at least in part on the first location, the second location, and angle of arrival information associated with the radio frequency signal. The UE 200, including processors 210 and the transceiver 215, is a means for determining the two measurements. In an example, referring to FIG. 9, the UE 904 may utilize the location of the base station 902 $(x_s, y_s, z_s)_{ECI}$ obtained at stage 1202, and its current location $(x_c, y_c, z_c)$ in the ECI and/or ENU frame obtained at stage 1204, to convert the location of the base station 902 to the ENU frame $(x_s', y_s', z_s')_{ENU}$ based on the current location $(x_c, y_c, z_c)$. The UE 904 may determine the AoA of the RF signal received at stage 1206 and determine the two measurements based on the observation functions described in the equations (4), (5), and (6). For example, the two measurements may include the elevation ($\theta$) and azimuth ($\varphi$) angles.

At stage 1210, the method includes determining a gravity vector based on inertial measurements obtained with the user equipment. The UE 200, including processors 210 and the IMU 270, is a means for determining the gravity vector. In an example, one or more accelerometers 273 may be configured to provide indications of the force of gravity along the x, y and z axes of a mobile device. The combination of the sensor outputs may be utilized to determine the gravity vector corresponding to the RPY frame of the wireless node. Other IMU sensors in the UE 200 may also be configured to provide gravity vector information.

At stage 1212, the method includes computing an orientation of the user equipment device based at least in part on the gravity vector and the two observation functions. The UE 200, including the processors 210, is a means for computing the orientation of the UE. The RPY gravity vector obtained at stage 1210 may be transformed as described in equations (7)-(11). The UE may utilize equations (5), (6), (9), (10) and (11) to fully solve $\mathfrak{R}_{ENU}^{RPY}$ or the 3 unknown rotation angles ($\alpha$, $\beta$, $\gamma$) to determine its orientation.

Figure 13:
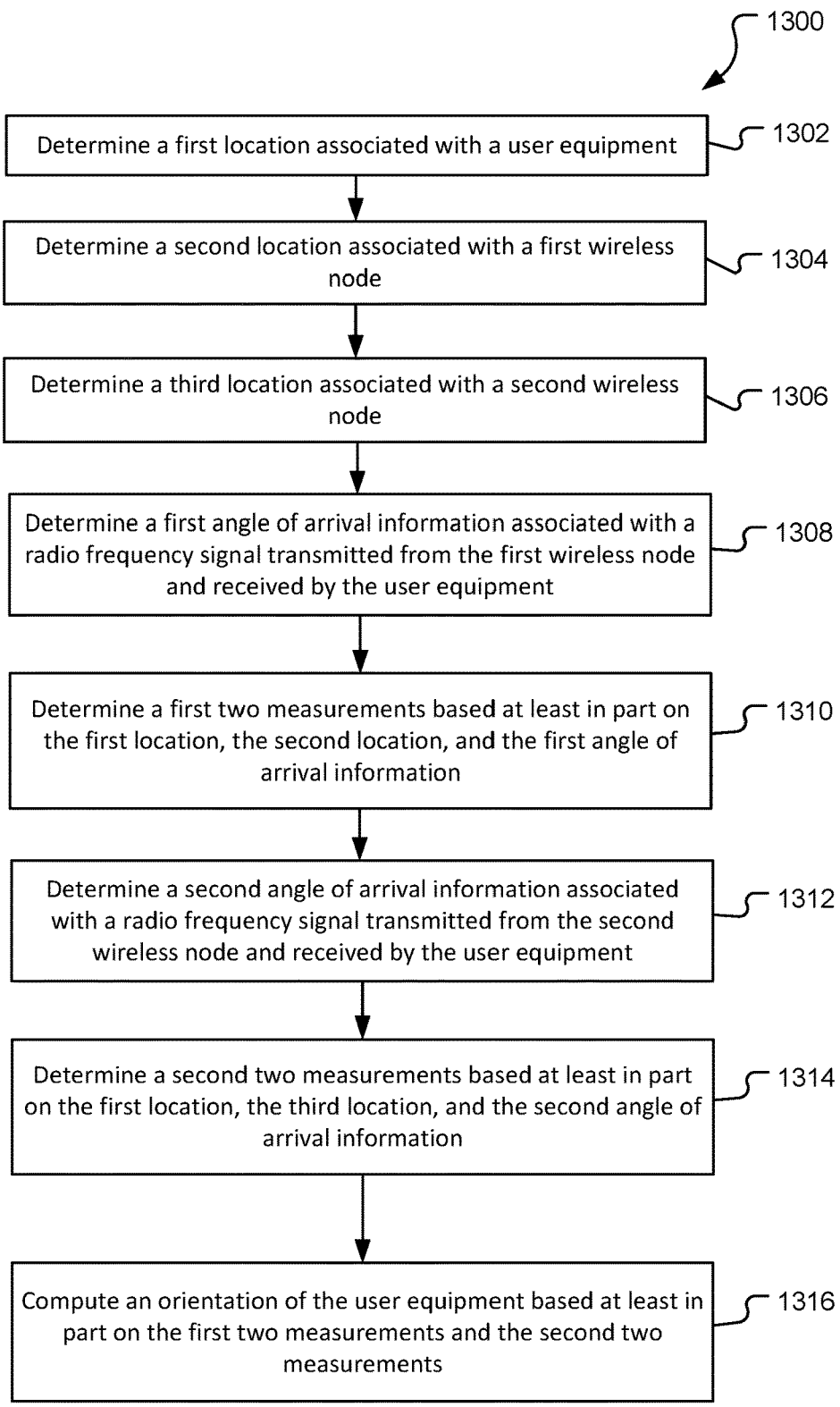
FIG. 13 is a block flow diagram of an example method for computing an orientation of a user equipment based on signals received from a plurality of wireless nodes.

Referring to FIG. 13, with further reference to FIGS. 1-11, a method 1300 of computing an orientation of a user equipment based on signals received from a plurality of wireless nodes includes the stages shown. The method 1300 is, however, an example and not limiting. The method 1300 may be altered, e.g., by having stages added, removed, rearranged, combined, performed concurrently, and/or having single stages split into multiple stages.

At stage 1302, the method includes determining a first location associated with a user equipment. A UE 200, including processors 210, the transceiver 215 and the SPS receiver 217, is a means for determining the first location associated with the UE. In an example, referring to FIG. 11, the UE is the UE 1104 and is configured to determine a current position based on terrestrial and/or satellite reference signals. For example, the UE 1104 may utilize known network positioning techniques such as depicted in FIGS. 5, and 6A to determine a location based on radio signal exchanges with other network stations. In an example, the SPS receiver 217 may provide satellite signal information (e.g., GPS) to determine the location of the UE 1104. Other positioning techniques may be used to determine the first location associated with the UE. In an example, a base station may require a new antenna installation. The location of the new antenna may be known and the orientation detection techniques described herein may be utilized to determine/calibrate the new antenna configuration.

At stage 1304, the method includes determining a second location associated with a first wireless node. A UE 200, including processors 210 and the transceiver 215, is a means for determining the second location associated with the first wireless node. In an example, referring to FIG. 11, the second location may be the location of the base station 1102 and may be determined based on assistance data provided to the UE. For example, the UE may receive assistance data via network signaling such as LPP and/or RRC messages (e.g., System Information Blocks) including the location of the base station 1102. Other signaling techniques may also be used. For example, the base station 1102 may periodically broadcast current location information. In an example, the second wireless node may be a mobile device at a known location. In a V2X schema, a vehicle may be configured to broadcast Basic Safety Messages (BSMs) including location information. Other techniques may be used to determine the second location associated with the first wireless node.

At stage 1306, the method includes determining a third location associated with a second wireless node. The UE 200, including the processors 210 and the transceiver 215, is a means for determining the third location associated with the second wireless node. In an example, referring to FIG. 11, the third location may be the location of the second mobile device 1110 and may be determined based on assistance or other positioning data provided to the UE 1104. In an example, the UE 1104 may receive the location of the second mobile device 1110 from the network via downlink signaling such as LPP and/or RRC messages. In an example, the second mobile device 1110 may be configured to transmit location information via a sidelink connection, or via other D2D communication links (e.g., WiFi, Bluetooth, etc.). Other signaling techniques may also be used to provide the location of the second mobile device 1110 to a wireless node in the network. In an example, the second wireless node may be another base station at a known location.

At stage 1308, the method includes determining a first angle of arrival information associated with a radio frequency signal transmitted from the first wireless node and received by the user equipment. The UE 200, including processors 210 and the transceiver 215, is a means for determining the first AoA information. In an example, the RF signal may be one or more reference signals (e.g., PRS, NRS, TRS, CRS, etc.) broadcast to wireless nodes in a coverage area. In a 5G NR application, for example, the RF signal may be a beamformed signal transmitted to the UE. Referring to FIG. 11, the RF signal may be the reference signal 1108 transmitted by the base station 1102. The UE 1104 is configured to determine AoA information associated with the received RF signals, as depicted in FIG. 10.

At stage 1310, the method includes determining a first two measurements based at least in part on the first location, the second location, and the first angle of arrival information. The UE 200, including the processors 210 and the transceiver 215, is a means for determining the first two measurements. In an example, referring to FIG. 11, the UE 1104 may utilize the location of the base station 1102 ($x_s$, $y_s$, $z_s$)$_{ECI}$ obtained at stage 1302, and its current location ($x_c$, $y_c$, $z_c$) in the ECI and/or ENU frame obtained at stage 1306, to convert the location of the base station 1102 to the ENU frame ($x_s'$, $y_s'$, $z_s'$)$_{ENU}$ based on the current location ($x_c$, $y_c$, $z_c$). The UE 1104 may utilize the first AoA information determined at stage 1308 and determine the first two measurements based on the observation functions described in equations (4), (5), and (6). For example, the first two measurements may be the elevation ($\theta$) and azimuth ($\varphi$) angles for the RF signal transmitted from the first wireless node.

At stage 1312, the method includes determining a second angle of arrival information associated with a radio frequency signal transmitted from the second wireless node and received by the user equipment. The UE 200, including processors 210 and the transceiver 215, is a means for determining the second AoA information. In an example, the RF signal may be received via one or more sidelink channels (e.g., Physical Sidelink Shared Channel (PSSCH), Physical Sidelink Broadcast Channel (PSBCH), etc.) and/or via other D2D radio access technologies (e.g., WiFi, Bluetooth, etc.). In a V2X environment, the radio frequency signal may be based on the PC5 interface. Referring to FIG. 11, the RF signal may be the reference signals 1112 transmitted by the second mobile device 1110. The UE 1104 is configured to determine AoA information associated with the received RF signals, as depicted in FIG. 10. In an example, the second wireless node may be a base station, and the RF signal transmitted from the base station may be one or more reference signals (e.g., PRS, NRS, TRS, CRS, etc.).

At stage 1314, the method includes determining a second two measurements based at least in part on the first location, the third location, and the second angle of arrival information. The UE 200, including processors 210 and the transceiver 215, is a means for determining the second two measurements. In an example, referring to FIG. 11, the UE 1104 may utilize the location of the second mobile device 1110 ($x_t$, $y_t$, $z_t$)$_{ECI}$ obtained at stage 1304, and its current location ($x_c$, $y_c$, $z_c$) in the ECI and/or ENU frame obtained at stage 1306, to convert the location of the second mobile device 1110 to the ENU frame ($x_t'$, $y_t'$, $z_t'$)$_{ENU}$ based on the current location ($x_c$, $y_c$, $z_c$). The UE 1104 may utilize the second AoA information determined at stage 1312 and determine the second two measurements based on the observation functions described in equations (4), (5), and (6). For example, the second two measurements may be based on the elevation ($\theta$) and azimuth ($\varphi$) angles of the RF signals transmitted by the second wireless node.

At stage 1316, the method includes computing an orientation of the user equipment based at least in part on the first two measurements and the second two measurements. The UE 200, including the processors 210, is a means for computing the orientation of the UE. The UE 1104 may utilize the four measurements (e.g., two (0) in equation (5), and two ($\varphi$) in equation (6)) to compute the orientation of the user equipment. While the example in FIG. 11 includes the base station 1102 and the second mobile device 1110, the method 1300 is not so limited. Other stations with known locations may also be used. Thus, signals transmitted by various combinations of base stations and/or mobile devices may be utilized to determine the orientation of a user equipment.

In an example, the method 1300 may be performed by a network resource, such as the LMF 120 and/or the gNB 110*a*. The UE 200 may be configured to provide location information and respective AoA information for the first and second wireless nodes to the network resource, and the network resource may be configured to compute the orientation of the UE 200 using the techniques described herein. The network resource may be configured to provide the resulting orientation information to the UE 200 via network messaging (e.g., LPP, RRC, etc.).

Figure 14:
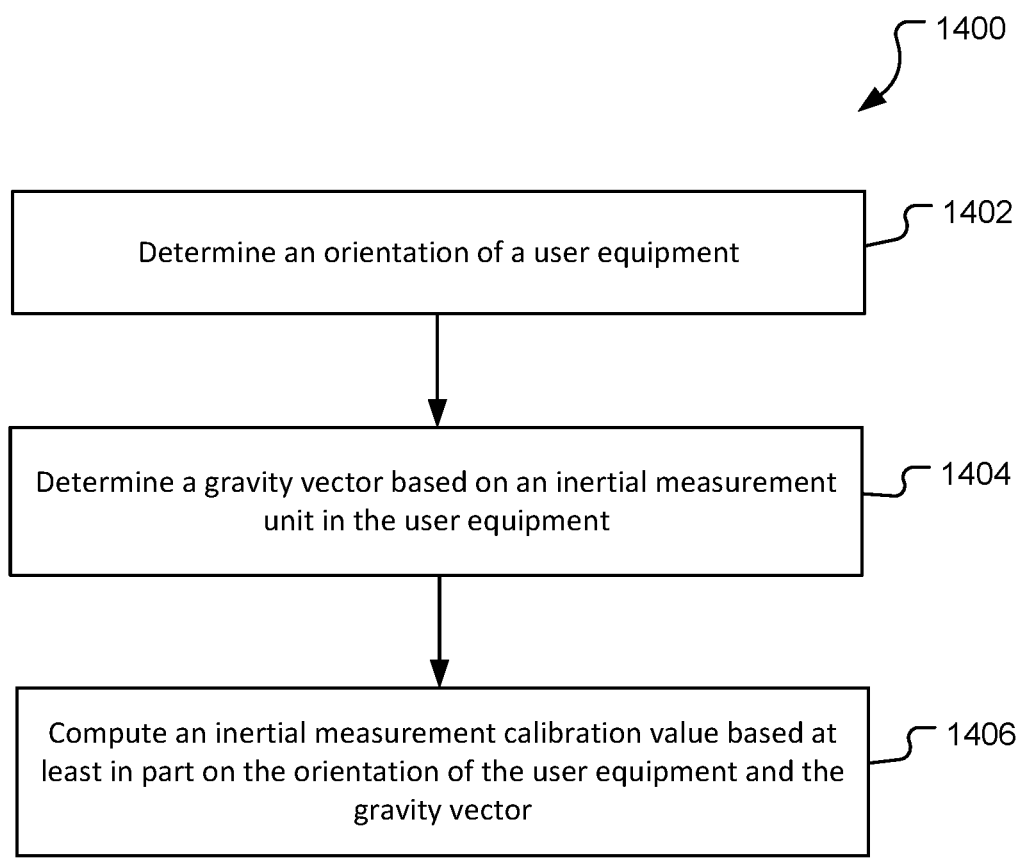
FIG. 14 is a block flow diagram of an example method for calibrating an inertial measurement unit.

Referring to FIG. 14, with further reference to FIGS. 1-11, a method 1400 of calibrating an inertial measurement unit includes the stages shown. The method 1400 is, however, an example and not limiting. The method 1400 may be altered, e.g., by having stages added, removed, rearranged, combined, performed concurrently, and/or having single stages split into multiple stages.

At stage 1402, the method includes determining an orientation of a user equipment. The UE 200, including the processors 210 and the transceiver 215, is a means for determining an orientation. In an example, the UE 1104 may be configured to determine an orientation based on the multi-station method described in FIGS. 11 and 13. The computed orientation may be used as a basis for calibrating the onboard IMU, or other orientation based sensors, within the UE 1104.

At stage 1404, the method includes determining a gravity vector based on an inertial measurement unit in the user equipment. The UE 200, including the processors 210 and the IMU 270, is a means for determining a gravity vector. The UE 1104 may be configured to obtain a gravity vector 1114 with an onboard IMU (e.g., the IMU 270) in the RPY frame $(x_g, y_g, z_g)_{RPY}$. In an example, one or more accelerometers 273 may be configured to provide indications of the force of gravity along the x, y and z axes of a mobile device. The combination of the sensor outputs may be utilized to determine the gravity vector corresponding to the RPY frame of the UE. Other IMU sensors may also be configured to provide gravity vector information to enable the UE 1104 to determine the gravity vector.

At stage 1406, the method includes computing an inertial measurement calibration value based at least in part on the orientation of the user equipment and the gravity vector. The UE 200, including the processors 210 and the IMU 270, is a means for computing the inertial measurement calibration value. The UE 1104 may be configured to convert the gravity vector 1114 into ENU frame $(x_g, y_g, z_g)_{ENU} = (x_g, y_g, z_g)_{RPY} \mathfrak{R}_{ENU}^{RPY}$. The UE 1104 may compare the measured gravity vector to a theoretical gravity vector based on the current orientation to compute the inertial measurement calibration value. For example, the inertial measurement calibration value may be the difference between the vectors $(x_g, y_g, z_g)_{ENU}$ and $(0,0, -1)_{ENU}$. If the inertial measurement calibration value is greater than a threshold value (e.g., 2, 5, 10 degrees, etc.), then the IMU (or other sensor) may be calibrated to reduce the error between the orientation determined at stage 1402 and the gravity vector determined at stage 1404. Other trigger conditions may also be used to initiate the method 1400. For example, when the UE is in static lockdown state (e.g., zero velocity) for a period of time (e.g., 2, 10, 100 seconds, etc.), when an uncertainty of an orientation angle estimate exceeds a threshold (e.g., 2, 5, 10 degrees, etc.), when functional issues occur for attitude devices (e.g., the IMU, camera, magnetometer, etc.), on-demand (e.g., triggered by an application), or combinations therein.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B means that the item may be configured to perform the function regarding A, or may be configured to perform the function regarding B, or may be configured to perform the function regarding A and B. For example, a phrase of "a processor configured to measure at least one of A or B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for determining an orientation of a user equipment, comprising: determining a first location associated with the user equipment; determining a second location associated with a first wireless node; receiving, with the user equipment, a radio frequency signal transmitted from the first wireless node; determining two measurements based at least in part on the first location, the second location, and angle of arrival information associated with the radio frequency signal; determining a gravity vector based on inertial measurements obtained with the user equipment; and computing the orientation of the user equipment based at least in part on the gravity vector and the two measurements.

Clause 2. The method of clause 1 wherein the first wireless node is a base station.

Clause 3. The method of clause 1 wherein the first wireless node is a mobile device.

Clause 4. The method of clause 1 wherein the radio frequency signal transmitted from the first wireless node is a positioning reference signal.

Clause 5. The method of clause 1 wherein the radio frequency signal is transmitted from the first wireless node via a sidelink channel.

Clause 6. The method of clause 1 wherein determining the first location includes measuring a plurality of signals associated with a satellite navigation system.

Clause 7. The method of clause 1 further comprising detecting a trigger condition, and wherein computing the orientation of the user equipment is in response to the trigger condition.

Clause 8. The method of clause 7 wherein detecting the trigger condition includes detecting a static lockdown state, determining an uncertainty of an orientation angle exceeds a threshold value, receiving a request from an application, or any combination thereof.

Clause 9. A method for determining an orientation of a user equipment, comprising: determining a first location associated with the user equipment; determining a second location associated with a first wireless node; determining a third location associated with a second wireless node; determining a first angle of arrival information associated with a radio frequency signal transmitted from the first wireless node and received by the user equipment; determining a first two measurements based at least in part on the first location, the second location, and the first angle of arrival information; determining a second angle of arrival information associated with a radio frequency signal transmitted from the second wireless node and received by the user equipment; determining a second two measurements based at least in part on the first location, the third location, and the second angle of arrival information; and computing the orientation of the user equipment based at least in part on the first two measurements and the second two measurements.

Clause 10. The method of clause 9 wherein at least one of the first wireless node and the second wireless node is a base station.

Clause 11. The method of clause 9 wherein at least one of the first wireless node and the second wireless node is a mobile device.

Clause 12. The method of clause 9 wherein at least one of the radio frequency signal transmitted from the first wireless node and the radio frequency signal transmitted from the second wireless node is a network reference signal.

Clause 13. The method of clause 9 wherein at least one of the radio frequency signal transmitted from the first wireless node and the radio frequency signal transmitted from the second wireless node utilizes a sidelink channel.

Clause 14. The method of clause 9 wherein determining the first location includes measuring a plurality of signals associated with a satellite navigation system.

Clause 15. The method of clause 9 further comprising detecting a trigger condition, and wherein computing the orientation of the user equipment is in response to detecting the trigger condition.

Clause 16. The method of clause 15 wherein detecting the trigger condition includes detecting a static lockdown state, determining an uncertainty of an orientation angle exceeds a threshold value, receiving a request from an application, or any combination thereof.

Clause 17. The method of clause 9 further comprising: obtaining a gravity vector based on an inertial measurement unit in the user equipment; and computing an inertial measurement calibration value based at least in part on the orientation of the user equipment and the gravity vector.

Clause 18. The method of clause 17 further comprising calibrating one or more sensors in the user equipment based on the inertial measurement calibration value.

Clause 19. The method of clause 18 wherein the one or more sensors include an accelerometer, a gyroscope, a magnetometer, or combinations thereof.

Clause 20. An apparatus, comprising: a memory; an inertial measurement unit; at least one transceiver; at least one processor communicatively coupled to the memory, the inertial measurement unit, and the at least one transceiver, and configured to: determine a first location associated with the apparatus; determine a second location associated with a first wireless node; receive a radio frequency signal transmitted from the first wireless node; determine two measurements based at least in part on the first location, the second location, and angle of arrival information associated with the radio frequency signal; determine a gravity vector based on inertial measurements obtained with the inertial measurement unit; and compute an orientation of the apparatus based at least in part on the gravity vector and the two measurements.

Clause 21. The apparatus of clause 20 wherein the first wireless node is a base station.

Clause 22. The apparatus of clause 20 wherein the first wireless node is a mobile device.

Clause 23. The apparatus of clause 20 wherein the radio frequency signal transmitted from the first wireless node is a positioning reference signal.

Clause 24. The apparatus of clause 20 wherein the radio frequency signal transmitted from the first wireless node via a sidelink channel.

Clause 25. The apparatus of clause 20 wherein the at least one processor is further configured to measure a plurality of signals associated with a satellite navigation system to determine the first location.

Clause 26. The apparatus of clause 20 wherein the at least one processor is further configured to detect a trigger condition and compute the orientation of the apparatus in response to the trigger condition.

Clause 27. The apparatus of clause 26 wherein the at least one processor is further configured to detect a static lockdown state, determine an uncertainty of an orientation angle exceeds a threshold value, receive a request from an application, or any combination thereof to detect the trigger condition.

Clause 28. An apparatus, comprising: a memory; at least one transceiver; at least one processor communicatively coupled to the memory and the at least one transceiver, and configured to: determine a first location associated with the apparatus; determine a second location associated with a first wireless node; determine a third location associated with a second wireless node; determine a first angle of arrival information associated with a radio frequency signal transmitted from the first wireless node and received by the apparatus; determine a first two measurements based at least in part on the first location, the second location, and the first angle of arrival information; determine a second angle of arrival information associated with a radio frequency signal transmitted from the second wireless node and received by the apparatus; determine a second two measurements based at least in part on the first location, the third location, and the second angle of arrival information; and compute an orientation of the apparatus based at least in part on the first two measurements and the second two measurements.

Clause 29. The apparatus of clause 28 wherein at least one of the first wireless node and the second wireless node is a base station.

Clause 30. The apparatus of clause 28 wherein at least one of the first wireless node and the second wireless node is a mobile device.

Clause 31. The apparatus of clause 28 wherein at least one of the radio frequency signal transmitted from the first wireless node and the radio frequency signal transmitted from the second wireless node is a network reference signal.

Clause 32. The apparatus of clause 28 wherein at least one of the radio frequency signal transmitted from the first wireless node and the radio frequency signal transmitted from the second wireless node utilizes a sidelink channel.

Clause 33. The apparatus of clause 28 wherein the at least one processor is further configured to measure a plurality of signals associated with a satellite navigation system to determine the first location.

Clause 34. The apparatus of clause 28 wherein the at least one processor is further configured to detect a trigger condition, and compute the orientation of the apparatus in response to the trigger condition.

Clause 35. The apparatus of clause 34 wherein the at least one processor is further configured to detect a static lockdown state, determine an uncertainty of an orientation angle exceeds a threshold value, receive a request from an application, or any combination thereof to detect the trigger condition.

Clause 36. The apparatus of clause 28 further comprising an inertial measurement unit, wherein the at least one processor is further configured to: obtain a gravity vector based on the inertial measurement unit; and compute an inertial measurement calibration value based at least in part on the orientation of the apparatus and the gravity vector.

Clause 37. The apparatus of clause 36 wherein the at least one processor is further configured to calibrate one or more sensors in the apparatus based on the inertial measurement calibration value.

Clause 38. The apparatus of clause 37 wherein the one or more sensors include an accelerometer, a gyroscope, a magnetometer, and combinations thereof.

Clause 39. An apparatus for determining an orientation of a user equipment, comprising: means for determining a first location associated with the user equipment; means for determining a second location associated with a first wireless node; means for receiving a radio frequency signal transmitted from the first wireless node with the user equipment; means for determining two measurements based at least in part on the first location, the second location, and angle of arrival information associated with the radio frequency signal; means for determining a gravity vector based on inertial measurements obtained with the user equipment; and means for computing the orientation of the user equipment based at least in part on the gravity vector and the two measurements.

Clause 40. An apparatus for determining an orientation of a user equipment, comprising: means for determining a first location associated with the user equipment; means for determining a second location associated with a first wireless node; means for determining a third location associated with a second wireless node; means for determining a first angle of arrival information associated with a radio frequency signal transmitted from the first wireless node and received by the user equipment; means for determining a first two measurements based at least in part on the first location, the second location, and the first angle of arrival information; means for determining a second angle of arrival information associated with a radio frequency signal transmitted from the second wireless node and received by the user equipment; means for determining a second two measurements based at least in part on the first location, the third location, and the second angle of arrival information; and means for computing the orientation of the user equipment based at least in part on the first two measurements and the second two measurements.

Clause 41. The apparatus of 40 further comprising: means for obtaining a gravity vector based on an inertial measurement unit in the user equipment; and means for computing an inertial measurement calibration value based at least in part on the orientation of the user equipment and the gravity vector.

Clause 42. A non-transitory processor-readable storage medium comprising processor-readable instructions configured to cause one or more processors determine an orientation of a user equipment, comprising code for: determining a first location associated with the user equipment; determining a second location associated with a first wireless node; receiving a radio frequency signal transmitted from the first wireless node with the user equipment; determining two measurements based at least in part on the first location, the second location, and angle of arrival information associated with the radio frequency signal; determining a gravity vector based on inertial measurements obtained with the user equipment; and computing the orientation of the user equipment based at least in part on the gravity vector and the two measurements.

Clause 43. A non-transitory processor-readable storage medium comprising processor-readable instructions configured to cause one or more processors determine an orientation of a user equipment, comprising code for: determining a first location associated with the user equipment; determining a second location associated with a first wireless node; determining a third location associated with a second wireless node; determining a first angle of arrival information associated with a radio frequency signal transmitted from the first wireless node and received by the user equipment; determining a first two measurements based at least in part on the first location, the second location, and the first angle of arrival information; determining a second angle of arrival information associated with a radio frequency signal transmitted from the second wireless node and received by the user equipment; determining a second two measurements based at least in part on the first location, the third location, and the second angle of arrival information; and computing the orientation of the user equipment based at least in part on the first two measurements and the second two measurements.

Clause 44. The non-transitory processor-readable storage medium of clause 43 further comprising code for: obtaining a gravity vector based on an inertial measurement unit in the user equipment; and computing an inertial measurement calibration value based at least in part on the orientation of the user equipment and the gravity vector.

The invention claimed is:

1. A method for determining an orientation of a user equipment, comprising:
   determining a first location associated with the user equipment;
   determining a second location associated with a first wireless node;
   receiving, with the user equipment, a radio frequency signal transmitted from the first wireless node;
   determining two measurements based at least in part on the first location, the second location, and angle of arrival information associated with the radio frequency signal;
   determining a gravity vector based on inertial measurements obtained with the user equipment; and
   computing the orientation of the user equipment based at least in part on the gravity vector and the two measurements.

2. The method of claim 1 wherein the first wireless node is a base station and the radio frequency signal transmitted from the first wireless node is a positioning reference signal.

3. The method of claim 1 wherein the first wireless node is a mobile device and the radio frequency signal is transmitted from the first wireless node via a sidelink channel.

4. The method of claim 1 further comprising detecting a trigger condition, and wherein computing the orientation of the user equipment is in response to the trigger condition.

5. The method of claim 4 wherein detecting the trigger condition includes detecting a static lockdown state, determining an uncertainty of an orientation angle exceeds a threshold value, receiving a request from an application, or any combination thereof.

6. A method for determining an orientation of a user equipment, comprising:
   determining a first location associated with the user equipment;

determining a second location associated with a first wireless node;
determining a third location associated with a second wireless node;
determining a first angle of arrival information associated with a radio frequency signal transmitted from the first wireless node and received by the user equipment;
determining a first two measurements based at least in part on the first location, the second location, and the first angle of arrival information;
determining a second angle of arrival information associated with a radio frequency signal transmitted from the second wireless node and received by the user equipment;
determining a second two measurements based at least in part on the first location, the third location, and the second angle of arrival information; and
computing the orientation of the user equipment based at least in part on the first two measurements and the second two measurements.

7. The method of claim 6 wherein at least one of the first wireless node and the second wireless node is a base station and at least one of the radio frequency signal transmitted from the first wireless node and the radio frequency signal transmitted from the second wireless node is a network reference signal.

8. The method of claim 6 wherein at least one of the first wireless node and the second wireless node is a mobile device and at least one of the radio frequency signal transmitted from the first wireless node and the radio frequency signal transmitted from the second wireless node utilizes a sidelink channel.

9. The method of claim 6 wherein determining the first location includes measuring a plurality of signals associated with a satellite navigation system.

10. The method of claim 6 further comprising detecting a trigger condition, and wherein computing the orientation of the user equipment is in response to detecting the trigger condition.

11. The method of claim 10 wherein the detecting the trigger condition includes detecting a static lockdown state, determining an uncertainty of an orientation angle exceeds a threshold value, receiving a request from an application, or any combination thereof.

12. The method of claim 6 further comprising:
obtaining a gravity vector based on an inertial measurement unit in the user equipment; and
computing an inertial measurement calibration value based at least in part on the orientation of the user equipment and the gravity vector.

13. The method of claim 12 further comprising calibrating one or more sensors in the user equipment based on the inertial measurement calibration value.

14. The method of claim 13 wherein the one or more sensors include an accelerometer, a gyroscope, a magnetometer, or combinations thereof.

15. An apparatus, comprising:
a memory;
an inertial measurement unit;
at least one transceiver;
at least one processor communicatively coupled to the memory, the inertial measurement unit, and the at least one transceiver, and configured to:
determine a first location associated with the apparatus;
determine a second location associated with a first wireless node;
receive a radio frequency signal transmitted from the first wireless node;
determine two measurements based at least in part on the first location, the second location, and angle of arrival information associated with the radio frequency signal;
determine a gravity vector based on inertial measurements obtained with the inertial measurement unit; and
compute an orientation of the apparatus based at least in part on the gravity vector and the two measurements.

16. The apparatus of claim 15 wherein the radio frequency signal transmitted from the first wireless node is a positioning reference signal.

17. The apparatus of claim 15 wherein the radio frequency signal transmitted from the first wireless node via a sidelink channel.

18. The apparatus of claim 15 wherein the at least one processor is further configured to measure a plurality of signals associated with a satellite navigation system to determine the first location.

19. The apparatus of claim 15 wherein the at least one processor is further configured to detect a trigger condition and compute the orientation of the apparatus in response to the trigger condition.

20. The apparatus of claim 19 wherein the at least one processor is further configured to detect a static lockdown state, determine an uncertainty of an orientation angle exceeds a threshold value, receive a request from an application, or any combination thereof to detect the trigger condition.

21. An apparatus, comprising:
a memory;
at least one transceiver;
at least one processor communicatively coupled to the memory and the at least one transceiver, and configured to:
determine a first location associated with the apparatus;
determine a second location associated with a first wireless node;
determine a third location associated with a second wireless node;
determine a first angle of arrival information associated with a radio frequency signal transmitted from the first wireless node and received by the apparatus;
determine a first two measurements based at least in part on the first location, the second location, and the first angle of arrival information;
determine a second angle of arrival information associated with a radio frequency signal transmitted from the second wireless node and received by the apparatus;
determine a second two measurements based at least in part on the first location, the third location, and the second angle of arrival information; and
compute an orientation of the apparatus based at least in part on the first two measurements and the second two measurements.

22. The apparatus of claim 21 wherein at least one of the first wireless node and the second wireless node is a base station.

23. The apparatus of claim 21 wherein at least one of the first wireless node and the second wireless node is a mobile device.

24. The apparatus of claim 21 wherein at least one of the radio frequency signal transmitted from the first wireless node and the radio frequency signal transmitted from the second wireless node is a network reference signal.

25. The apparatus of claim 21 wherein at least one of the radio frequency signal transmitted from the first wireless node and the radio frequency signal transmitted from the second wireless node utilizes a sidelink channel.

26. The apparatus of claim 21 wherein the at least one processor is further configured to measure a plurality of signals associated with a satellite navigation system to determine the first location.

27. The apparatus of claim 21 wherein the at least one processor is further configured to detect a trigger condition, and compute the orientation of the apparatus in response to the trigger condition.

28. The apparatus of claim 27 wherein the at least one processor is further configured to detect a static lockdown state, determine an uncertainty of an orientation angle exceeds a threshold value, receive a request from an application, or any combination thereof to detect the trigger condition.

29. The apparatus of claim 21 further comprising an inertial measurement unit, wherein the at least one processor is further configured to:
   obtain a gravity vector based on the inertial measurement unit; and
   compute an inertial measurement calibration value based at least in part on the orientation of the apparatus and the gravity vector.

30. The apparatus of claim 29 wherein the at least one processor is further configured to calibrate one or more sensors in the apparatus based on the inertial measurement calibration value.

* * * * *